US008706708B2

(12) United States Patent
Reynar et al.

(10) Patent No.: US 8,706,708 B2
(45) Date of Patent: *Apr. 22, 2014

(54) PROVIDING CONTEXTUALLY SENSITIVE TOOLS AND HELP CONTENT IN COMPUTER-GENERATED DOCUMENTS

(75) Inventors: Jeff Reynar, Woodinville, WA (US); Paul Broman, Renton, WA (US); Joe Keng Yap, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 972 days.

This patent is subject to a terminal disclaimer.

(21) Appl. No.: 11/924,856

(22) Filed: Oct. 26, 2007

(65) Prior Publication Data

US 2008/0046812 A1   Feb. 21, 2008

Related U.S. Application Data

(63) Continuation of application No. 10/164,960, filed on Jun. 6, 2002, now Pat. No. 7,356,537.

(51) Int. Cl.
 *G06F 7/00* (2006.01)
 *G06F 17/30* (2006.01)
 *G06F 3/00* (2006.01)

(52) U.S. Cl.
 USPC ........... 707/705; 707/805; 715/234; 715/760; 715/779

(58) Field of Classification Search
 USPC .......... 707/803, 805, 705; 715/234, 762, 760, 715/779
 See application file for complete search history.

(56) References Cited

U.S. PATENT DOCUMENTS

| 4,674,065 A | 6/1987 | Lange et al. ................ 382/311 |
| 4,868,750 A | 9/1989 | Kucera et al. ...................... 711/2 |

(Continued)

FOREIGN PATENT DOCUMENTS

| CA | 2 246 920 A1 | 3/2000 |
| CN | 200410005390.8 | 10/2008 |

(Continued)

OTHER PUBLICATIONS

Australian First Official Action dated Oct. 21, 2008 cited in 2003204800.

(Continued)

*Primary Examiner* — Vincent F Boccio
(74) *Attorney, Agent, or Firm* — Rachel Vaughn; Jim Ross; Micky Minhas

(57) ABSTRACT

A method and system are provided for creation, implementation, and use of computer-generated "smart" documents to which functionality is attached for providing contextually sensitive tools, controls and help content to users of those documents. Portions of documents are annotated with Extensible Markup Language (XML) tags and structure so that when a user enters those portions, such as by placing a computer cursor in those portions, the user is provided contextually sensitive tools, controls and/or help content. A document tools pane may open on the user's computer screen adjacent to the document being edited for providing the document tools, controls or help content related to the context of the text or data in which the cursor is located. If the user moves the cursor to another portion of the document, the user may obtain information associated with the context of the new portion of the document in which the cursor is located.

12 Claims, 8 Drawing Sheets

(56) References Cited

U.S. PATENT DOCUMENTS

| | | | |
|---|---|---|---|
| 5,020,019 A | 5/1991 | Ogawa | 707/5 |
| 5,128,865 A | 7/1992 | Sadler | 704/2 |
| 5,159,552 A | 10/1992 | van Gasteren et al. | 704/1 |
| 5,267,155 A | 11/1993 | Buchanan et al. | 715/540 |
| 5,287,448 A | 2/1994 | Nicol et al. | 715/707 |
| 5,297,039 A | 3/1994 | Kanaegami et al. | 707/5 |
| 5,317,546 A | 5/1994 | Balch et al. | 368/9 |
| 5,337,233 A | 8/1994 | Hofert et al. | 715/540 |
| 5,341,293 A | 8/1994 | Vertelney et al. | 715/530 |
| 5,351,190 A | 9/1994 | Kondo | 704/8 |
| 5,386,564 A | 1/1995 | Shearer et al. | 395/650 |
| 5,392,386 A | 2/1995 | Chalas | 715/841 |
| 5,418,902 A | 5/1995 | West et al. | 715/503 |
| 5,446,891 A | 8/1995 | Kaplan et al. | 395/600 |
| 5,522,089 A | 5/1996 | Kikinis et al. | 710/73 |
| 5,535,323 A | 7/1996 | Miller et al. | 715/707 |
| 5,541,836 A | 7/1996 | Church et al. | 704/7 |
| 5,546,521 A | 8/1996 | Martinez | 715/711 |
| 5,581,684 A | 12/1996 | Dudzik et al. | 715/708 |
| 5,596,700 A | 1/1997 | Darnell et al. | 715/512 |
| 5,617,565 A | 4/1997 | Augenbraun et al. | 395/604 |
| 5,625,783 A | 4/1997 | Ezekiel et al. | 395/352 |
| 5,627,567 A | 5/1997 | Davidson | 345/173 |
| 5,627,958 A | 5/1997 | Potts et al. | 715/708 |
| 5,634,019 A | 5/1997 | Koppolu et al. | 715/744 |
| 5,640,560 A | 6/1997 | Smith | 395/615 |
| 5,657,259 A | 8/1997 | Davis et al. | 708/204 |
| 5,685,000 A | 11/1997 | Cox, Jr. | 704/9 |
| 5,708,825 A | 1/1998 | Sotomayor | 395/762 |
| 5,715,415 A | 2/1998 | Dazey et al. | 715/708 |
| 5,717,923 A | 2/1998 | Dedrick | 395/613 |
| 5,752,022 A | 5/1998 | Chiu et al. | 395/610 |
| 5,761,689 A | 6/1998 | Rayson et al. | 707/533 |
| 5,764,794 A | 6/1998 | Perlin | 382/186 |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 707/501 |
| 5,799,068 A | 8/1998 | Kikinis et al. | 379/93.06 |
| 5,802,253 A | 9/1998 | Gross et al. | 395/51 |
| 5,802,262 A | 9/1998 | Van De Vanter | 395/180 |
| 5,802,299 A | 9/1998 | Logan et al. | 395/200.48 |
| 5,802,530 A | 9/1998 | van Hoff | 707/513 |
| 5,805,911 A | 9/1998 | Miller | 395/796 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 395/200.66 |
| 5,822,720 A | 10/1998 | Bookman et al. | 704/3 |
| 5,826,025 A | 10/1998 | Gramlich | 395/200.47 |
| 5,832,100 A | 11/1998 | Lawton et al. | 382/100 |
| 5,845,077 A | 12/1998 | Fawcett | 709/221 |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,884,266 A | 3/1999 | Dvorak | 704/270.1 |
| 5,892,919 A | 4/1999 | Nielsen | 395/200.58 |
| 5,893,073 A | 4/1999 | Kasso et al. | 705/8 |
| 5,893,132 A | 4/1999 | Huffman et al. | 715/201 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,907,704 A | 5/1999 | Gudmundson et al. | |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,139 A | 8/1999 | Feigner et al. | 715/708 |
| 5,933,140 A | 8/1999 | Strahorn et al. | 715/712 |
| 5,933,498 A | 8/1999 | Schneck et al. | 705/54 |
| 5,940,614 A | 8/1999 | Allen et al. | 717/120 |
| 5,944,787 A | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,413 A | 10/1999 | Beauregard et al. | 707/6 |
| 5,987,480 A | 11/1999 | Donohue et al. | 715/501.1 |
| 5,991,719 A | 11/1999 | Yazaki et al. | 704/251 |
| 5,995,756 A | 11/1999 | Herrmann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,028,605 A | 2/2000 | Conrad et al. | 345/840 |
| 6,029,135 A | 2/2000 | Krasle | 704/275 |
| 6,029,171 A | 2/2000 | Smiga et al. | 707/102 |
| 6,031,525 A | 2/2000 | Perlin | 345/173 |
| 6,052,531 A | 4/2000 | Waldin et al. | 717/170 |
| 6,061,516 A | 5/2000 | Yoshikawa et al. | 717/109 |
| 6,067,087 A | 5/2000 | Krauss et al. | 715/762 |
| 6,072,475 A | 6/2000 | Van Ketwich | 345/173 |
| 6,073,090 A | 6/2000 | Fortune et al. | 704/8 |
| 6,085,201 A | 7/2000 | Tso | 715/505 |
| 6,088,711 A | 7/2000 | Fein et al. | 715/523 |
| 6,092,074 A | 7/2000 | Rodkin et al. | 707/102 |
| 6,108,640 A | 8/2000 | Slotznick | 705/26 |
| 6,108,674 A | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 707/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,469 A | 12/2000 | Safai et al. | 710/62 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | 715/705 |
| 6,219,698 B1 | 4/2001 | Iannucci et al. | 709/221 |
| 6,246,404 B1 | 6/2001 | Feigner et al. | 715/708 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,282,489 B1 | 8/2001 | Bellesfield et al. | 701/201 |
| 6,289,513 B1 * | 9/2001 | Bentwich | 707/999.006 |
| 6,291,785 B1 | 9/2001 | Koga et al. | 209/584 |
| 6,292,768 B1 | 9/2001 | Chan | 704/1 |
| 6,295,061 B1 | 9/2001 | Park et al. | 715/764 |
| 6,297,822 B1 | 10/2001 | Feldman | 715/705 |
| 6,300,950 B1 | 10/2001 | Clark et al. | 715/705 |
| 6,308,171 B1 | 10/2001 | De La Huerga | 707/3 |
| 6,311,152 B1 | 10/2001 | Bai et al. | 704/9 |
| 6,311,177 B1 | 10/2001 | Dauerer et al. | 707/2 |
| 6,311,194 B1 | 10/2001 | Sheth et al. | 715/505 |
| 6,320,496 B1 | 11/2001 | Sokoler et al. | 340/470.1 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe | 709/203 |
| 6,338,059 B1 | 1/2002 | Fields et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/11 |
| 6,349,295 B1 | 2/2002 | Tedesco et al. | 707/3 |
| 6,353,926 B1 | 3/2002 | Parthesarathy et al. | 717/170 |
| 6,381,742 B2 | 4/2002 | Forbes et al. | 717/176 |
| 6,382,350 B1 | 5/2002 | Jezewski et al. | 181/290 |
| 6,392,668 B1 | 5/2002 | Murray | 715/38 |
| 6,396,515 B1 | 5/2002 | Hetherington et al. | 715/762 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,415,304 B1 | 7/2002 | Horvitz | 715/205 |
| 6,421,678 B2 | 7/2002 | Smiga et al. | 707/102 |
| 6,424,979 B1 | 7/2002 | Livingston et al. | 715/511 |

(56) References Cited

U.S. PATENT DOCUMENTS

| | | | |
|---|---|---|---|
| 6,434,567 B1 | 8/2002 | De La Huerga | 707/102 |
| 6,438,545 B1 | 8/2002 | Beauregard et al. | 707/6 |
| 6,441,753 B1 | 8/2002 | Montgomery | 341/34 |
| 6,442,545 B1 | 8/2002 | Feldman et al. | 707/8 |
| 6,442,591 B1 | 8/2002 | Haynes et al. | 709/206 |
| 6,456,304 B1 | 9/2002 | Angiulo et al. | 715/779 |
| 6,470,091 B2 | 10/2002 | Koga et al. | 382/101 |
| 6,473,069 B1 | 10/2002 | Gerpheide | 345/157 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,498,982 B2 | 12/2002 | Bellesfield et al. | 701/202 |
| 6,510,504 B2 | 1/2003 | Satyanarayanan | 711/170 |
| 6,516,321 B1 | 2/2003 | De La Huerga | 707/102 |
| 6,519,557 B1 | 2/2003 | Emens et al. | 704/8 |
| 6,519,603 B1 | 2/2003 | Bays et al. | 707/102 |
| 6,546,433 B1 | 4/2003 | Matheson | 709/318 |
| 6,553,385 B2 | 4/2003 | Johnson et al. | 707/104.1 |
| 6,556,972 B1 | 4/2003 | Bakis et al. | 704/277 |
| 6,556,984 B1 | 4/2003 | Zien | 707/2 |
| 6,564,264 B1 | 5/2003 | Creswell et al. | 709/245 |
| 6,571,241 B1 | 5/2003 | Nosohara | 707/6 |
| 6,571,253 B1 | 5/2003 | Thompson et al. | 707/103 R |
| 6,578,022 B1 * | 6/2003 | Foulger et al. | 706/45 |
| 6,591,260 B1 | 7/2003 | Schwarzhoff et al. | 707/2 |
| 6,595,342 B1 | 7/2003 | Maritzen et al. | 194/212 |
| 6,601,075 B1 | 7/2003 | Huang et al. | 707/104.1 |
| 6,604,099 B1 | 8/2003 | Chung et al. | 707/3 |
| 6,615,131 B1 | 9/2003 | Rennard et al. | 701/200 |
| 6,618,733 B1 | 9/2003 | White et al. | 707/103 |
| 6,622,140 B1 | 9/2003 | Kantrowitz | 707/5 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,631,519 B1 | 10/2003 | Nicholson et al. | 717/169 |
| 6,636,880 B1 | 10/2003 | Bera | 708/206 |
| 6,643,650 B1 | 11/2003 | Slaughter et al. | 707/10 |
| 6,654,734 B1 | 11/2003 | Mani et al. | 707/2 |
| 6,654,932 B1 | 11/2003 | Bahrs et al. | 715/507 |
| 6,658,623 B1 | 12/2003 | Schilit et al. | 715/513 |
| 6,687,485 B2 | 2/2004 | Hopkins et al. | |
| 6,694,307 B2 | 2/2004 | Julien | 707/3 |
| 6,697,824 B1 | 2/2004 | Bowman-Amuah | 709/229 |
| 6,697,837 B1 | 2/2004 | Rodov | 709/203 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,741,994 B1 | 5/2004 | Kang et al. | 707/102 |
| 6,742,054 B1 | 5/2004 | Upton, IV | 710/6 |
| 6,745,208 B2 | 6/2004 | Berg et al. | 707/201 |
| 6,766,326 B1 | 7/2004 | Cena | 707/101 |
| 6,795,808 B1 | 9/2004 | Strubbe et al. | 704/275 |
| 6,802,061 B1 | 10/2004 | Partovi et al. | 717/173 |
| 6,826,726 B2 | 11/2004 | Hsing et al. | 715/513 |
| 6,829,631 B1 | 12/2004 | Forman et al. | 709/202 |
| 6,845,499 B2 | 1/2005 | Srivastava et al. | 717/100 |
| 6,857,103 B1 | 2/2005 | Wason | 715/709 |
| 6,859,908 B1 | 2/2005 | Clapper | 715/224 |
| 6,868,625 B2 | 3/2005 | Jacobsen et al. | 715/738 |
| 6,874,125 B1 | 3/2005 | Carroll et al. | 715/705 |
| 6,874,143 B1 | 3/2005 | Murray et al. | 717/173 |
| 6,880,129 B1 | 4/2005 | Lee et al. | 715/763 |
| 6,883,137 B1 | 4/2005 | Girardot et al. | 715/513 |
| 6,898,604 B1 | 5/2005 | Ballinger et al. | 707/101 |
| 6,901,402 B1 | 5/2005 | Corston-Oliver et al. | 701/101 |
| 6,904,560 B1 | 6/2005 | Panda | 715/202 |
| 6,925,457 B2 | 8/2005 | Britton et al. | 707/1 |
| 6,925,470 B1 | 8/2005 | Sangudi et al. | 707/102 |
| 6,944,857 B1 | 9/2005 | Glaser et al. | 717/173 |
| 6,948,133 B2 | 9/2005 | Haley | 715/780 |
| 6,950,831 B2 | 9/2005 | Haley | 707/104.1 |
| 6,950,982 B1 | 9/2005 | Dourish | 715/512 |
| 6,957,385 B2 | 10/2005 | Chan et al. | 715/504 |
| 6,963,867 B2 | 11/2005 | Ford et al. | 707/3 |
| 6,964,010 B1 | 11/2005 | Sharp | 715/507 |
| 6,975,983 B1 | 12/2005 | Fortescue et al. | 704/9 |
| 6,976,090 B2 | 12/2005 | Ben-Shaul et al. | 709/246 |
| 6,976,209 B1 | 12/2005 | Storisteanu et al. | 715/512 |
| 6,981,212 B1 | 12/2005 | Claussen et al. | 715/205 |
| 6,986,104 B2 | 1/2006 | Green et al. | 715/523 |
| 6,990,654 B2 * | 1/2006 | Carroll, Jr. | 715/762 |
| 7,003,522 B1 | 2/2006 | Reynar et al. | 707/10 |
| 7,013,289 B2 | 3/2006 | Horn et al. | 705/26 |
| 7,024,658 B1 | 4/2006 | Cohen et al. | 717/117 |
| 7,028,312 B1 | 4/2006 | Merrick et al. | 719/330 |
| 7,032,174 B2 | 4/2006 | Montero et al. | 715/257 |
| 7,039,859 B1 | 5/2006 | Sundaresan | 715/229 |
| 7,051,076 B2 | 5/2006 | Tsuchiya | 709/206 |
| 7,082,392 B1 | 7/2006 | Butler et al. | 704/233 |
| 7,100,115 B1 | 8/2006 | Yennaco | 715/748 |
| 7,113,976 B2 | 9/2006 | Watanabe | 709/206 |
| 7,146,564 B2 | 12/2006 | Kim et al. | 715/235 |
| 7,216,351 B1 | 5/2007 | Maes | 719/328 |
| 7,237,190 B2 | 6/2007 | Rollins et al. | 715/234 |
| 7,281,245 B2 | 10/2007 | Reynar et al. | 717/173 |
| 7,302,634 B2 | 11/2007 | Lucovsky et al. | 715/200 |
| 7,305,354 B2 | 12/2007 | Rodriguez et al. | 705/26 |
| 7,325,194 B2 | 1/2008 | Moore et al. | 715/530 |
| 7,346,840 B1 * | 3/2008 | Ravishankar et al. | 715/234 |
| 7,356,537 B2 | 4/2008 | Reynar et al. | 707/100 |
| 7,392,479 B2 | 6/2008 | Jones et al. | 715/513 |
| 7,421,645 B2 | 9/2008 | Reynar | 715/206 |
| 7,454,459 B1 | 11/2008 | Kapoor et al. | 709/203 |
| 7,707,024 B2 | 4/2010 | Arayasantiparb et al. | |
| 7,707,496 B1 | 4/2010 | Moore et al. | |
| 7,712,024 B2 | 5/2010 | Reynar et al. | |
| 7,716,163 B2 | 5/2010 | Reynar et al. | |
| 7,716,676 B2 | 5/2010 | Sawicki et al. | |
| 7,739,588 B2 | 6/2010 | Reynar et al. | |
| 7,742,048 B1 | 6/2010 | Moore et al. | |
| 7,770,102 B1 | 8/2010 | Wolff et al. | |
| 7,778,816 B2 | 8/2010 | Reynar | |
| 7,783,614 B2 | 8/2010 | Jones et al. | |
| 7,788,602 B2 | 8/2010 | Reynar et al. | |
| 7,827,546 B1 | 11/2010 | Jones et al. | |
| 2001/0029605 A1 | 10/2001 | Forbes et al. | 717/11 |
| 2001/0041328 A1 | 11/2001 | Fisher | 434/157 |
| 2001/0042098 A1 | 11/2001 | Gupta et al. | 709/206 |
| 2001/0049702 A1 | 12/2001 | Najmi | 707/513 |
| 2001/0056461 A1 | 12/2001 | Kampe et al. | 709/201 |
| 2002/0002590 A1 | 1/2002 | King et al. | 709/206 |
| 2002/0003469 A1 | 1/2002 | Gupta | 340/407.1 |
| 2002/0003898 A1 | 1/2002 | Wu | 382/187 |
| 2002/0004803 A1 | 1/2002 | Serebrennikov | 715/513 |
| 2002/0007309 A1 | 1/2002 | Reynar | 705/14 |
| 2002/0023113 A1 | 2/2002 | Hsing et al. | 707/513 |
| 2002/0023136 A1 | 2/2002 | Silver et al. | 709/206 |
| 2002/0026450 A1 | 2/2002 | Kuramochi | 707/104.1 |
| 2002/0029304 A1 | 3/2002 | Reynar et al. | 709/332 |
| 2002/0035581 A1 | 3/2002 | Reynar et al. | 715/513 |
| 2002/0038180 A1 | 3/2002 | Bellesfield et al. | 701/202 |
| 2002/0065110 A1 | 5/2002 | Enns et al. | 455/566 |
| 2002/0065891 A1 | 5/2002 | Malik | 709/206 |
| 2002/0066073 A1 | 5/2002 | Lienhard et al. | 717/105 |
| 2002/0078222 A1 | 6/2002 | Compas et al. | 709/232 |
| 2002/0085020 A1 * | 7/2002 | Carroll, Jr. | 345/700 |
| 2002/0087591 A1 | 7/2002 | Reynar et al. | |
| 2002/0091803 A1 | 7/2002 | Imamura et al. | 709/220 |
| 2002/0099687 A1 | 7/2002 | Krishnaprasad et al. | 707/1 |
| 2002/0100036 A1 | 7/2002 | Moshir et al. | 717/173 |
| 2002/0103829 A1 | 8/2002 | Manning et al. | 707/513 |
| 2002/0104080 A1 | 8/2002 | Woodard et al. | 717/176 |
| 2002/0110225 A1 | 8/2002 | Cullis | 379/67.1 |
| 2002/0111928 A1 | 8/2002 | Haddad | 707/1 |
| 2002/0120685 A1 | 8/2002 | Srivastava et al. | 709/203 |
| 2002/0129060 A1 | 9/2002 | Rollins et al. | |
| 2002/0129107 A1 | 9/2002 | Loughran et al. | 709/206 |
| 2002/0133523 A1 | 9/2002 | Ambler et al. | 707/536 |
| 2002/0149601 A1 | 10/2002 | Rajarajan et al. | 345/619 |
| 2002/0156774 A1 | 10/2002 | Beauregard et al. | 707/3 |

(56) References Cited

U.S. PATENT DOCUMENTS

| | | | |
|---|---|---|---|
| 2002/0156792 A1 | 10/2002 | Gombocz et al. | 707/100 |
| 2002/0169802 A1 | 11/2002 | Brewer et al. | 707/513 |
| 2002/0175955 A1 | 11/2002 | Gourdol et al. | 345/821 |
| 2002/0178008 A1 | 11/2002 | Reynar | 704/272 |
| 2002/0178182 A1 | 11/2002 | Wang et al. | 715/501.1 |
| 2002/0184247 A1 | 12/2002 | Jokela et al. | 707/204 |
| 2002/0188941 A1 | 12/2002 | Cicciarelli et al. | 717/175 |
| 2002/0196281 A1 | 12/2002 | Audleman et al. | 345/762 |
| 2002/0198909 A1 | 12/2002 | Huynh et al. | 707/513 |
| 2003/0002391 A1 | 1/2003 | Biggs | 368/82 |
| 2003/0005411 A1 | 1/2003 | Gerken | 717/120 |
| 2003/0009489 A1 | 1/2003 | Griffin | 707/500 |
| 2003/0014745 A1 | 1/2003 | Mah et al. | 717/170 |
| 2003/0025728 A1 | 2/2003 | Ebbo et al. | 345/744 |
| 2003/0046316 A1 | 3/2003 | Gergic et al. | 707/513 |
| 2003/0050911 A1 | 3/2003 | Lucovsky et al. | 707/1 |
| 2003/0051236 A1 | 3/2003 | Pace et al. | 717/175 |
| 2003/0056207 A1 | 3/2003 | Fischer et al. | 717/174 |
| 2003/0081791 A1 | 5/2003 | Erickson et al. | 380/282 |
| 2003/0083910 A1 | 5/2003 | Sayal et al. | 705/7 |
| 2003/0084138 A1 | 5/2003 | Tavis et al. | 709/223 |
| 2003/0097318 A1 | 5/2003 | Yu et al. | 705/35 |
| 2003/0101190 A1 | 5/2003 | Horvitz et al. | 707/100 |
| 2003/0101204 A1 | 5/2003 | Watson | 708/206 |
| 2003/0101416 A1 | 5/2003 | McInnes et al. | 715/513 |
| 2003/0106040 A1 | 6/2003 | Rubin et al. | 717/106 |
| 2003/0115039 A1 | 6/2003 | Wang | 704/4 |
| 2003/0121033 A1 | 6/2003 | Peev et al. | 717/175 |
| 2003/0126136 A1 | 7/2003 | Omoigui | 707/10 |
| 2003/0140308 A1 | 7/2003 | Murthy et al. | 715/500 |
| 2003/0154144 A1 | 8/2003 | Pokorny et al. | 705/28 |
| 2003/0158841 A1 | 8/2003 | Britton et al. | 707/3 |
| 2003/0158851 A1 | 8/2003 | Britton et al. | 707/100 |
| 2003/0167445 A1 | 9/2003 | Su et al. | 715/513 |
| 2003/0172343 A1 | 9/2003 | Leymaster et al. | 715/500 |
| 2003/0177341 A1 | 9/2003 | Devillers | 712/227 |
| 2003/0182391 A1 | 9/2003 | Leber et al. | 709/217 |
| 2003/0192040 A1 | 10/2003 | Vaughan | 171/173 |
| 2003/0195937 A1 | 10/2003 | Kircher, Jr. et al. | 709/207 |
| 2003/0212527 A1 | 11/2003 | Moore et al. | 702/179 |
| 2003/0220795 A1 | 11/2003 | Arayasantiparb et al. | 704/275 |
| 2003/0229593 A1 | 12/2003 | Raley et al. | 705/55 |
| 2003/0233330 A1 | 12/2003 | Raley et al. | 705/55 |
| 2004/0002939 A1 | 1/2004 | Arora et al. | 707/1 |
| 2004/0003389 A1 | 1/2004 | Reynar et al. | 717/178 |
| 2004/0006564 A1 | 1/2004 | Lucovsky et al. | 707/10 |
| 2004/0006741 A1 | 1/2004 | Radja et al. | 715/513 |
| 2004/0024875 A1 | 2/2004 | Horvitz et al. | 709/226 |
| 2004/0039990 A1 | 2/2004 | Bakar et al. | 715/505 |
| 2004/0044959 A1 | 3/2004 | Shanmugasundaram et al. | 715/513 |
| 2004/0068694 A1 | 4/2004 | Kaler et al. | 715/513 |
| 2004/0083218 A1 | 4/2004 | Feng | 707/100 |
| 2004/0133846 A1 | 7/2004 | Khoshatefeh et al. | 715/500 |
| 2004/0143581 A1 | 7/2004 | Bohannon et al. | 707/100 |
| 2004/0165007 A1 | 8/2004 | Shafron | 345/781 |
| 2004/0181756 A1* | 9/2004 | Berringer et al. | 715/530 |
| 2004/0199861 A1 | 10/2004 | Lucovsky | 715/500 |
| 2004/0201867 A1 | 10/2004 | Katano | 358/1.15 |
| 2004/0236717 A1 | 11/2004 | Demartini et al. | 707/1 |
| 2005/0050164 A1 | 3/2005 | Burd et al. | 709/217 |
| 2005/0055330 A1 | 3/2005 | Britton et al. | 707/1 |
| 2005/0094850 A1 | 5/2005 | Nakao | 382/103 |
| 2005/0108195 A1 | 5/2005 | Yalovsky et al. | 707/1 |
| 2005/0120313 A1 | 6/2005 | Rudd et al. | 715/866 |
| 2005/0187926 A1 | 8/2005 | Britton et al. | 707/3 |
| 2006/0173674 A1 | 8/2006 | Nakajima et al. | 704/9 |
| 2010/0268793 A1 | 10/2010 | Wolff et al. | |

FOREIGN PATENT DOCUMENTS

| | | | | |
|---|---|---|---|---|
| EP | 0 364 180 A2 | 4/1990 | | |
| EP | 0481784 A2 | 4/1992 | | G06F 15/20 |
| EP | 0598511 A | 5/1994 | | G06F 9/445 |
| EP | 0872827 A2 | 10/1998 | | G10L 3/00 |
| EP | 0810520 B1 | 12/1998 | | G06F 9/44 |
| EP | 1093058 A1 | 4/2001 | | G06F 17/27 |
| EP | 1280068 A2 | 1/2003 | | G06F 17/27 |
| EP | 1361523 A2 | 11/2003 | | G06F 17/27 |
| EP | 1376392 A2 | 1/2004 | | G06F 17/24 |
| EP | 1 447 754 A1 | 8/2004 | | |
| EP | 1 452 966 A3 | 9/2004 | | |
| JP | 64-88771 | 4/1989 | | G06F 15/20 |
| JP | 03-152663 | 6/1991 | | |
| JP | 05-174013 | 7/1993 | | |
| JP | 06-035962 | 2/1994 | | |
| JP | 06-096064 | 4/1994 | | |
| JP | 07-036917 | 2/1995 | | |
| JP | 08-272662 | 10/1996 | | |
| JP | 09-138636 | 5/1997 | | |
| JP | 10-171827 | 6/1998 | | |
| JP | 10-240737 | 9/1998 | | |
| JP | 2000-067056 | 3/2000 | | |
| JP | 2000-222394 | 8/2000 | | |
| JP | 2000-231566 | 8/2000 | | |
| JP | 2001-014303 | 1/2001 | | |
| JP | 2001-125994 | 5/2001 | | |
| JP | 2001-522112 | 11/2001 | | |
| JP | 2001-0350464 | 12/2001 | | |
| JP | 2002-041353 | 2/2002 | | |
| JP | 2002163250 A | 6/2002 | | G06F 17/21 |
| JP | 2002-222181 | 8/2002 | | |
| JP | 2003-141174 | 5/2003 | | |
| JP | 4567952 | 10/2010 | | |
| JP | 4809577 | 8/2011 | | |
| MX | 272521 | 12/2009 | | |
| TW | 317624 | 10/1997 | | |
| TW | 338136 | 8/1998 | | |
| TW | 515963 | 1/2003 | | |
| TW | 2004-133892 | 4/2004 | | |
| TW | I364674 | 5/2012 | | |
| WO | WO 95/07510 A1 | 3/1995 | | G06F 17/24 |
| WO | WO 99/17240 A1 | 4/1999 | | G06F 17/60 |
| WO | WO 00/54174 A1 | 9/2000 | | G06F 17/21 |
| WO | WO 00/67117 | 11/2000 | | |
| WO | WO 00/73949 A1 | 12/2000 | | |
| WO | WO 01/18687 A1 | 3/2001 | | G06F 17/30 |
| WO | WO 01/37170 A | 5/2001 | | G06F 17/60 |
| WO | WO 01/86390 A2 | 11/2001 | | G06F 1/00 |
| WO | WO 02/099627 A1 | 1/2002 | | G06F 9/00 |
| WO | WO 02/15518 A2 | 2/2002 | | H04L 29/00 |
| WO | WO 02/42928 A1 | 5/2002 | | |
| WO | WO 2004/012099 A2 | 2/2004 | | G06F 17/21 |

OTHER PUBLICATIONS

U.S. Final Office Action dated Dec. 24, 2008 cited in U.S. Appl. No. 09/841,265.

Sharon Oviatt et al., "Integration and Synchronization of Input Modes during Multimodal Human-Computer Interaction," CHI 97, Atlanta, Georgia, Mar. 22-27, 1997, pp. 415-422.

U.S. Office Action dated Dec. 23, 2008 cited in U.S. Appl. No. 10/179,810.

U.S. Office Action dated Jan. 5, 2009 cited in U.S. Appl. No. 10/141,712.

European Statement regarding Grounds of Appeal dated Jan. 13, 2009 cited in Application No. 04 002 224.6.

Malaysian Examination Report dated Nov. 30, 2009 cited in Application No. PI 20040559.

Australian Third Official Action dated Dec. 23, 2009 cited in Application No. 2003204478.

Australian First Official Action Report dated Jan. 18, 2009 cited in Application No. 2004200459.

Hara, T. et al., "Inside Microsoft.NET-Complete Explanation, 'What Microsoft Aims for'", msdn magazine, No. 6, pp. 20-35, ASCII, Japan, Sep. 18, 2000, 19 pp.

Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese—no translation yet).

(56) References Cited

OTHER PUBLICATIONS (Previously cited) Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53 (with English language translation).
U.S. Final Office Action dated Jan. 22, 2009 cited in U.S. Appl. No. 10/366,141.
U.S. Office Action dated Feb. 4, 2009 cited in U.S. Appl. No. 10/377,258.
U.S. Final Office Action dated Mar. 4, 2009 cited in U.S. Appl. No. 10/780,376.
European Summons to Attend Oral Proceedings dated Feb. 26, 2009 cited in European Application No. 03012830.0-2211.
European Communication dated Mar. 18, 2009 cited in European Application No. 04003683.2-2211.
European Summons to Attend Oral Proceedings dated Mar. 20, 2009 cited in European Application No. 03012830.0.
Australian First Examiner's Report dated Sep. 15, 2008 cited in Australian Application No. 2003204379.
Japanese Final Official Action dated Nov. 25, 2008 cited in Japanese Application No. 2002-207514.
Japanese Official Action dated Feb. 6, 2009 cited in Japanese Application No. 2003-180218.
Japanese Official Action dated Feb. 13, 2009 cited in Japanese Application No. 2003-162911.
Japanese Official Action dated Feb. 24, 2009 cited in Japanese Application No. 2003-161338.
Japanese Official Action dated Mar. 6, 2009 cited in Japanese Application No. 2004-042140.
Malaysian Office Action dated Feb. 25, 2010 cited in Application No. PI 20040265.
Korean Office Action dated Mar. 12, 2010 cited in Application No. 10-2003-36252.
Chinese Second Office Action dated Apr. 6, 2010 cited in Application No. 03143003.1.
Japanese Final Notice of Rejection dated Apr. 9, 2010 cited in Application No. 2003-162911.
U.S. Appl. No. 10/184,190, filed Jun. 27, 2002, entitled "System and Method for Providing Namespace Related Information".
U.S. Appl. No. 10/164,260, filed Jun. 5, 2002, entitled "Mechanism for Downloading Software Components from a Remote Source for Use by a Local Software Application".
Fernandex M. et al., "SilkRoute: Trading Between Relations and XML", *Computer Networks*, Elsevier Science Publishers B.V., Amsterdam NL, vol. 33, No. 1-6, Jun. 2000, pp. 723-745.
Braganholo VDP; "Updating Relationship Databases Through XML Views", *Technical Report RP-328*, Online (http://www.inf.ufrgs.br/{vanessa/disc/iplinas/PropostaTese.pdf), Porto Alegre, RS, Brasil, Sep. 2002, XP-002279067, pp. 1-61.
Falquet G et al., "Design and Analysis of Active Hypertext Views on Databases", *CUI—Technical Report*, Online (http://cui.unige.ch/isi/reports/design-anls-ahtv.pdf), Jan. 2002, XP-002279068, pp. 1-24.
Ceri S et al., "Deriving Production Rules for Incremental View Maintenance", *Proceedings of the International Conference on Very Large Data Bases*, 1994, XP-00914159, pp. 577-589.
Bonifati A., "Active Behaviors Within XML Document Management", *EDBT Ph.D. Workshop*, (EDBT Ph.D. WS 2000), Online (http://www.edbt2000.uni-konstanz.de/phd-workshop/papers/Bonifati.ps), Mar. 2000, Konstanz, Germany, XP-002279069, pp. 1-4.
U.S. Appl. No. 10/731,899, filed Dec. 9, 2003, entitled "Mechanism for Downloading Software Components from a Remote Source for Use by a Local Software Application".
"Integrating with External Systems: iPlanet™ Unified Development Server", Sun Microsystems, Inc., Ver. 5.0, Aug. 2001, pp. 127-156.
Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.
Quin, Liam, "Extensible Markup Language (XML)", W3C Architecture Domain, http://web.archive.org/web/2002121962057/http://www.w3.org/XML/, 1996-2002, pp. 1-3.
Clark, James, and DeRose, Steve, "XML Path Language (XPath), Version 1.0", W3C, http://web.archive.org/web/2021010034434/http://www.w3.org/TR/xpath, 1999-2000, pp. 1-31.
"Microsoft BizTalk Server 2002—Using BizTalk Mapper", http://msdn.Microsoft.com/library/en-us/bts_2002/htm/lat_xmltools_map_intro_zkqb.asp . . . , Microsoft Corporation, 1999-2001, pp. 1-2.
"BizTalk Server 2002 Mapper User Interface", http://msdn.microsoft.com/library/en-us/bts_2002/htm/lat_xmltools_map_concept_codw . . . , Microsoft Corporation, 1999-2001, pp. 1.
"BizTalk Server 2002 Compiling Data", http://msdn.microsoft.com/library/en-us/bts_2002/htm/lat_xmltools_map_concept_drgl.a . . . , Microsoft Corporation, 1999-2001, pp. 1.
"BizTalk Server 2002 Testing Maps", http://msdn.microsoft.com/library/en-us/bts_2002/htm/lat_xmltools_map_concept_fhhy.a . . . , Microsoft Corporation, 1999-2001, pp. 1-2.
"BizTalk Server 2002 View Links and Functoids by Using Grid Preview", http://msdn.microsoft.com/library/en-us/bts_2002/htm/lat_xmltools_map_check_fuwn.as . . . , Microsoft Corporation, 1999-2001, pp. 1.
"The StarOffice™ 6.0 Suite: New Features Guide", Sun Microsystems, V. 1.1, Jul. 2002, pp. 1-31.
"New Microsoft Office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.
"Q&A: How 'XDocs' Alters the Paradigm for Gathering Business-Critical Information", http://www.microsoft.com/presspass/press/2002/oct02/10-09officefamily.mspx, Microsoft Corporation, Oct. 2002-Feb. 2003, pp. 1-4.
"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.
"Microsoft Unveils Visual Studio.NET Enterprise Tools", Microsoft Corporation, http://microsoft.com/presspass/press/2001/may01/05-21vseepr.mspx, May 2001, pp. 1-4.
"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.
"Integrated Development Environment (IDE)", http://web.archive.org/web/20020602032242/http://altova.com/products_ide.html, Jun. 2002, pp. 1-2.
"How to Use XSL to Transform Excel XML Spreadsheet for Server-Side Use", http://support.microsoft.com/default.aspx?scid=kb;en-us;278976, Microsoft Corporation, Aug. 2004, pp. 1-7.
"Altova markup your mind!", http://web.archive.org/web/20021204211721/http://altova.com/products_ide.html, Dec. 2002, pp. 1-3.
"Arbortext and Accessibility", http://web.archive.org/web/20021219133536/www.arbortext.com/html/accessibility.html, Dec. 2002, pp. 1-5.
"XML Compliance, 100% Pure XML", http:web.archive.org/web/20021209185855/www.arbortext.com/html/xml_compliance, Dec. 2002, pp. 1-3.
"Schemas", http://web.archive.org/web/20021221023148/www.arbortext.com/html/schemas.html, Dec. 2002, pp. 13.
"Arbortext's Support for XSL-FO", http://web.archive.org/web/20021221021632/www.arbortext.com/html/xsl-fo.html. Dec. 2002, pp. 1-4.
"Corel XMetal[4], Making XML Content Creation Easy", http://web.archive.org/web/20031118215158/www.corel.com/servlet/Satellite?pagename, Nov. 2003, pp. 1-2.
"Corel XMetal 4 and Interwoven TeamXML", http ://web.archive.org/web/20030807211225/www.corel.com/futuretense_cs/ccurl/corel+xml+4+and+interwoven+teamxml.pdf, Aug. 2003, pp. 1-2.
"The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

(56) References Cited

OTHER PUBLICATIONS

Alex Homer, et al.: "Professional Active Server pp.", 1997, WROS Press Ltd.
David Flanagan: "JavaScript—The Definitive Guide, Fourth Edition", Jan. 2002, O'Reilly.
Santos, C.A.S., L.F.G Soares, G.L. de Souza and J.P. Courtiat: *Design methodology and formal validation of hypermedia documents*; Proceedings of the sixth ACM international conference on multimedia, (1998) p. 39-48.
Terveen, Loren, Will Hill and Brian Amento; *Constructing, organizating, and visualizing collections of tropically related Web resources*; ACM Trans, Comput-um. Interact. 6, (Mar. 1, 1999) p. 67-94.
Barrett, Rob, Paul P. Maglio and Daniel C. Kellem; *How to personalize the Web*; Conference proceedings on human factors in computing systems (1997) p. 75-82.
Marx, Matthew and Chris Schmandt; *CLUES: dynamic personalized message filtering*; Proceedings of the ACM 1996 conference on computer supported cooperative work (1996) p. 113-121.
Goschka, Karl M. and Jurgen Falb; *Dynamic hyperlink generation for navigation in relational databases*; Proceedings of the tenth ACM conference on hypertext and hypermedia: returning to our diverse roots (1999) p. 23-24.
Pentland, Alex; *Perceptual user interfaces: perceptual intelligence*; Commun. ACM 43, 3 (Mar. 2000) p. 35-44.
Stairmand, Mark A.; *Texual context analysis for information retrieval*; Proceedings of the 20th annual international ACM SIGIR conference on research and development in information retrieval (1997) p. 140-147.
Glushko, Robert J., Jay M. Tenenbaum and Bart Meltzer; *An XML framework for agent-based E-commerce*; Commun. ACM 42, 3 (Mar. 1999) p. 106.
Kukich, Karen; *Technique for Automatically Correcting Words in Text*; ACM Comput. Surv., 24, 4 (Dec. 1992); pp. 377-439.
Marx, Matt and Chris Schmandt; *Putting People First: Specifying Proper Names in Speech Interfaces*; Proceedings of the ACM Symposium on User Interface Software and Technology; 1994; pp. 29-37.
Ford, Bryan, Mike Hibler, Jay Lepreau, Roland McGrath and Patrick Tullman; *Interface and execution models in the fluke kernal*; Proceedings of the third symposium on operating systems design and implementation, (1999) p. 101-115.
Desmarais, Michel C. and Jiming Liu; *Exploring the applications user-expertise assessment for intelligent interfaces*; Proceedings of the conference on human factors in corrupting systems, (1993) p. 308-313.
Foley, James D.; *Future directions in user-computer interface software*; Conference proceedings on organizational computer systems, (1991) p. 289-297.
Hartson, H. Rex and Deborah Hix; *Human-computer interface development: concepts and systems for its management*; ACM Comput. Surv. 1 (Mar. 1989) p. 5-92.
Foley, Jim; *Intergrating computer technology, people technology; strategies and case studies from Georgia Tech's Graphics, Visualization and Usability Center*; Proceedings of the workshop on advanced visual interfaces, (1994) p. 34-43.
Tsai, M., P. Reiher and G.J. Popek; *Command management system for next-generation user input*; Proceedings of the seventh workshop on hottopics in operating systems, (1999) p. 179-84.
*Microsoft Computer Dictionary*, Microsoft, Microsoft Press, Fifth Edition, p. 409.
Kuenning, Geoff, "Using ISPELL from Emacs", http://theochem.ki.ku.dk/on_line_docs/ispell/ispell_1.html, 4 pp., publication date unknown.
"Spellout Command", Commands Reference, vol. 5, http://www.rz.uni-hohenheim.de/betriebssysteme/unix/aix/ aix_4.3.3_doc/base_doc/usr/share/man/inf . . . , 1 page, publication date unknown.
"Chapter 8—Standard Input and Output", http://www.comp.lancs.ac.uk/computing/users/eiamjw/unix/chap8.html, 3 pp., publication date unknown.

Panagiotis, Christias, Man-cgi 1.15, http://www.physics.umn.edu/cgi-bin/man-cgi?spell, 1994, 5 pp.
Bischof, Hans-Peter, "Spell, Spellin, Spellout—Finding Spelling Errors", http://www.vorlesungen.uni-osnabrueck.de/informatik/shellscript/Html/Man/_Man_NeXT_html/html . . . , Apr. 21, 1997, 2 pp.
"Module 123—Spell", http://duplex.hypermart.net/books/bsd/501-504.html, 4 pp., publication date unknown.
Panagiotis, Christias, Man-cgi 1.15, http://www.calpoly.edu/cgi-bin/man-cgi?spell+1, 1994, 3 pp.
Martensson, Bengt, "Thread-Enhanced Spell Front End for GNU Emacs + Detex + Delatex", http://www.geocrawler.com/archives/3/337/1987/8/0/1871981/, Aug. 20, 1987, 1 p.
Willisson, Pace, Ispell (1), http://www.rt.com/man/findaffix.1.html, 1983, 15 pp.
Willisson, Pace, Ispell (1), "User Commands", http://www.csee.usf.edu/cgi-bin/man-cgi?ispell, 1983, 18 pp.
"Handout 38: Spell Checking, Word Counting, and Textual Analysis", http://courses.cs.emporia.edu/pheattch/courses/2002/cs501s02/hand38/, 3 pp., publication date unknown.
Keunning, Geoff, "International Spell", http://fmg-www.cs.ucla.edu/geoff.ispell.html, 3 pp., publication date unknown.
Ispell 4, "Ispell—Format of Ispell Dictionaries and Affix Files", http://www.bigbiz.com/cgi-bin/manpage?4+ispell, 11 pp., publication date unknown.
McMahon, Lee. E., "SED—A Non-Interactive Text Editor," Bell Laboratories, Murray Hill, New Jersey 07974, Aug. 15, 1978, pp. 16.
Beitner, N. D.; Hall, W.; Goble, C.A., "Multimedia Support and Authoring in Microcosm: An Extended Model," Dept. of Electronics and Computer Science, Univ. of Southampton, Southampton SO17 1BJ, UK; Dept. of Computer Science, Univ. of Manchester, Oxford Road, Manchester MI3 9PL, UK, pp. 1-12, publication date unknown.
IBM Corporation, "IBM Research Disclosure #368; Multimedia Hyperlinks Automatically Created for Reference Documents," *IBM Technical Disclosure Bulletin*, Jun. 1993, pp. 1-5.
*The Complete LINUX™ Operating System 5.2 Deluxe*, Red Hat,® Macmillian Digital Publishing USA, A Viacom Company, Red Hat Software, Inc., ISBN 1-57595-199-1B, 1995-1998, pp. 1-385.
*User Manual For AddressMate and AddressMate Plus*, CoStar Corporation, AddressMate Software, 1994-1995, pp. 1-210.
*Getting Results With Microsoft® Office 97, Real World Solutions For The Work You Do*, Microsoft Corporation, 1995-1997, pp. 1-703.
*InfoCentral™ 7*, User's Manual, Corel Corporation, vol. 1, Version 7.0, 1996, pp. 1-86.
Corel® Office Professional 7 Quick Results User's Manual, vol. 1, Version 7.0 (first printing), Corel Corporation, Limited, pp. 1-531, publication date unknown.
Novell GroupWise User's Guide for Windows 16-Bit Version 5.2, Novell, Inc., 1993-1997, pp. 1-231.
Novell GroupWise User's Guide for Windows 32-Bit Version 5.2, Novell, Inc., 1998, pp. 1-318.
Claris Em@iler Getting Started User's Guide, for Macintosh, Claris Corporation, 1995-1997, 61 pp.
Developer's Guide to Apple Data Detectors, for Version 1.0.2., Apple Computer, Inc., 1997, pp. 1-33.
Apple Data Detectors User's Manual, Apple Computer, Inc., 1997, pp. 1-15.
Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.
Hewkin, "Smart Tags—the Distributed-Memory Resolution", IEE Review, Jun. 22, 1989, pp. 203-206.
Measuring Units Conversion Table—http://web.archie.org—1997 Internet French Property, pp. 1-4.
IBM Technical Disclosure Bulletin, "National Language Support Enhancement for Culture-Specific Operations", Nov. 1, 1993, vol. 36, Issue 11, pp. 629-638.
Towers, J. Tarin, Visual Quickstart Guide: Dreamweaver 2 for Windows and Macintosh, 1999, Peachpit Press, pp. 150-151.

(56) References Cited

OTHER PUBLICATIONS

Driza, Scott, "Learn Word 2000 VBA Document Automation", Wordware Publishing Inc., 2001, 6 pp.
Cornell, Paul, "Developing Smart Tag DLLs", MSDN Library, http://msdn.microsoft.com/library/default.asp?url=/library/en-us/dnsmarttag/html/odc_smarttags.asp, Apr. 2001, pp. 8.
Menu Customizing, IBM Technical Disclosure Bulletin, vol. 34, No. 1, Jun. 1991, pp. 91-92 (4 pp. total).
Perry, Brad, et al., "Discovering Similar Resources by Content Park-Linking", Proceedings of the Sixth International Conference on Information and Knowledge Management, published by ACM Press 1997, pp. 317-324.
Schulz, Charles, "Writing Applications for Uniform Operation on a Mainframe or PC: A Metric Conversion Program", Lockheed Missles & Space Company, Inc., Sunnyvale, CA, May 1990, pp. 348-361.
Devanbue, P. et al., "Chime: customizable hyperlink insertion and maintenance engine for software engineering environments", Software Engineering, Publication date: 1999, ISBN: 1-58113-07400.
"Using Flyswat", http://www.flywsat.com/using.html, download date: Sep. 28, 1999, 1 pp.
"What is Flyswat", http://www.flyswat.com, download date: Sep. 28, 1999, 5 pp.
"Intelligent Text Processing: About", http://www.syntalex.co.uk/about/about.html, download date: Aug. 7, 1999, 1 pp.
"Intelligent Text Processing: Automatic Cross-Referencing", http://www.syntalex.co.uk/services/acrl.html, download date Aug. 7, 1999, 3 pp.
"Intelligent Text Processing: Case Study: Context", http://www.syntalex.co.uk/casestudies/context.html, download date: Aug. 7, 1999, 3 pp.
Mueller, Jennifer M., "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.
Brooks-Bilson, "Programming ColdFusion" [electronic resource] 2001, Safari Tech Books Online, 1st Edition, 25 pp.
Wilker, John, "ColdFusion MX Adds J2EE, XML, and Web Services Compatibility", Aug. 9, 2002, http://builder.com.com/5102-6387-104585.html, 3 pp.
Brockschmidt, K., "Inside OLE, Second Edition", 1995, Microsoft Press, p. 169.
Toth, V., "Visual C++ 4 Unleashed", 1996, Sams Publishing, p. 174.
Sriram, V., "ComponentXchange: An E-Exchange for Software Components", Master Thesis, CitSeer, May 2001, pp. i-v, 1-77.
Bosak, "XML: The Universal Publishing Format", SGML/XML Europe '98, May 1998, pp. A1-C17.
Kristensen, "Template Resolution in XML/HTML", Computer Networks and ISDN Systems, vol. 30, 1998, pp. 239-249.
Fan et al., "FormPlus: A Form Authoring Toolkit", Proceedings of the Fourteenth Annual Computer Software and Applications Conference, Oct. 31, 1990-Nov. 2, 1990, pp. 255-260.
Boone, "Concept Features in Re: Agent, An Intelligent Email Agent", Proceedings of the 2nd International Conference on Autonomous Agents, May 9-13, 1998, pp. 141-148.
Takkinen et al., "CAFÉ: A Conceptual Model for Managing Information in Electronic Mail", Proceedings of the Annual Hawaii International Conference on System Sciences, 1998, pp. 44-53.
"Smart Tags: Dumb Technology?", webreference.com, Online, Aug. 29, 2001, http://www.webreference.com/xml/column30/3.html, 3 pp.
"Being 'Smart' with Smart Tags in Office XP", Create for Mississippi, Aug. 2001, http://www.create.cett.msstate.edu/create/howto/smart_tags.pdf, 7 pp.
Harold, E.R., "XML: Extensible Markup Language", IDG Books Worldwide, Books 24×7.com printout, 1998, pp. 1-11.
Marais, Hannes, "Supporting Cooperative and Personal Surfing With a Desktop Assistant", 1997, ACM Press, pp. 129-138.
U.S. Appl. No. 09/818,157, filed Mar. 27, 2001, entitled "Automatically Adding Proper Names to a Database".
U.S. Appl. No. 09/841,265, filed Apr. 24, 2001, entitled "Method and System for Applying Input Mode Bias".
U.S. Appl. No. 09/841,266, filed Apr. 24, 2001, entitled "Method and System for Providing Electronic Commerce Actions Based on Semantically Labeled Strings".
U.S. Appl. No. 09/906,552, filed Jul. 16, 2001, entitled "Method and System for Providing Restricted Actions for Recognized Semantic Categories".
U.S. Appl. No. 10/366,141, filed Feb. 13, 2003, entitled "Linking Elements of a Document to Corresponding Fields, Queries and/or Procedures in a Database".
U.S. Appl. No. 09/906,467, filed Jul. 16, 2001, entitled "Application Program Interfaces for Semantically Labeling Strings and Providing Actions Based on Semantically Labeled Strings".
U.S. Appl. No. 09/907,418, filed Jul. 17, 2001, entitled "Method and System for Defining Semantic Categories and Actions".
U.S. Appl. No. 09/588,411, filed Jun. 6, 2000, entitled "Method and System for Semantically Labeling Strings and Providing Actions Based on Semantically Labeled Strings".
U.S. Appl. No. 10/141,712, filed May 9, 2002, entitled "Method, System, and Apparatus for Converting Dates Between Calendars and Languages Based Upon Semantically Labeled Strings".
U.S. Appl. No. 10/154,630, filed May 23, 2002, entitled "Method, System, and Apparatus for Converting Numbers Based Upon Semantically Labeled Strings".
U.S. Appl. No. 10/140,544, filed May 7, 2002, entitled "Method, System, and Apparatus for Converting Numbers Between Measurement Systems Based Upon Semantically Labeled Strings".
U.S. Appl. No. 10/155,680, filed May 23, 2002, entitled "Method, System, and Apparatus for Converting Currency Values Based Upon Semantically Labeled Strings".
U.S. Appl. No. 10/179,810, filed Jun. 25, 2002, entitled "Method, System, and Apparatus for Performing Custom Actions on Digital Content".
U.S. Appl. No. 10/178,680, filed Jun. 24, 2002, entitled "System and Method for Incorporating Smart Tags in Online Content".
U.S. Appl. No. 10/179,438, filed Jun. 25, 2002, entitled "Method and System for Dynamically Providing Actions Associated with Semantically Labeled Strings".
U.S. Appl. No. 10/184,298, filed Jun. 27, 2002, entitled "Method and System for Associating Actions with Semantic Labels in Electronic Documents".
U.S. Appl. No. 10/377,258, filed Feb. 28, 2003, entitled "Method and System for Enhancing Paste Functionality of a Computer Software Application".
U.S. Appl. No. 10/426,446, filed Apr. 29, 2003, entitled "Methods and System for Recognizing Names in a Computer-Generated Document and for Providing Helpful Actions Associated with Recognized Names".
U.S. Appl. No. 10/608,267, filed Jun. 27, 2003, entitled "Leveraging Markup Language Data for Semantically Labeling Text Strings and Data and for Providing Actions Based on Semantically Labeled Text Strings and Data".
U.S. Appl. No. 10/780,376, filed Feb. 17, 2004, entitled "Methods and Systems for Providing Automatic Actions on Recognized Text Strings in a Computer-Generated Document".
U.S. Appl. No. 10/183,317, filed Jun. 25, 2002, entitled "System and Method for Issuing a Message to a Program".
U.S. Official Action dated Dec. 29, 2003 in U.S. Appl. No. 09/588,411.
U.S. Official Action dated Feb. 12, 2004 in U.S. Appl. No. 10/154,630.
U.S. Official Action dated Mar. 29, 2004 in U.S. Appl. No. 09/906,552.
U.S. Official Action dated Jun. 14, 2004 in U.S. Appl. No. 09/588,411.
U.S. Official Action dated Jun. 18, 2004 in U.S. Appl. No. 09/818,157.
U.S. Official Action dated Jul. 15, 2004 in U.S. Appl. No. 09/906,467.
U.S. Official Action dated Aug. 20, 2004 in U.S. Appl. No. 09/841,266.
U.S. Official Action dated Sep. 29, 2004 in U.S. Appl. No. 09/907,418.
U.S. Official Action dated Oct. 6, 2004 in U.S. Appl. No. 09/818,157.
U.S. Official Action dated Nov. 2, 2004 in U.S. Appl. No. 10/178,680.

(56) References Cited

OTHER PUBLICATIONS

U.S. Official Action dated Dec. 8, 2004 in U.S. Appl. No. 09/588,411.
U.S. Official Action dated Jan. 25, 2005 in U.S. Appl. No. 09/906,552.
U.S. Official Action dated Jan. 26, 2005 in U.S. Appl. No. 10/154,630.
U.S. Official Action dated Mar. 1, 2005 in U.S. Appl. No. 09/818,157.
U.S. Official Action dated Mar. 17, 2005 in U.S. Appl. No. 09/841,265.
U.S. Official Action dated Mar. 24, 2005 in U.S. Appl. No. 10/141,712.
U.S. Official Action dated Apr. 19, 2005 in U.S. Appl. No. 09/841,266.
U.S. Official Action dated May 5, 2005 in U.S. Appl. No. 09/906,467.
U.S. Official Action dated May 6, 2005 in U.S. Appl. No. 09/907,418.
U.S. Official Action dated May 20, 2005 in U.S. Appl. No. 10/184,298.
U.S. Official Action dated Jun. 3, 2005 in U.S. Appl. No. 10/154,630.
U.S. Official Action dated Jun. 6, 2005 in U.S. Appl. No. 10/164,260.
U.S. Official Action dated Jun. 24, 2005 in U.S. Appl. No. 10/140,544.
U.S. Official Action dated Jul. 25, 2005 in U.S. Appl. No. 10/179,438.
U.S. Official Action dated Sep. 2, 2005 in U.S. Appl. No. 10/366,141.
U.S. Official Action dated Oct. 4, 2005 in U.S. Appl. No. 10/183,317.
U.S. Official Action dated Oct. 5, 2005 in U.S. Appl. No. 10/179,810.
U.S. Official Action dated Oct. 20, 2005 in U.S. Appl. No. 09/906,552.
U.S. Official Action dated Nov. 2, 2005 in U.S. Appl. No. 10/184,190.
U.S. Official Action dated Nov. 10, 2005 in U.S. Appl. No. 10/164,260.
U.S. Official Action dated Nov. 15, 2005 in U.S. Appl. No. 09/841,265.
U.S. Official Action dated Nov. 22, 2005 in U.S. Appl. No. 10/141,712.
U.S. Official Action dated Dec. 5, 2005 in U.S. Appl. No. 09/907,418.
U.S. Official Action dated Dec. 14, 2005 in U.S. Appl. No. 10/608,267.
U.S. Official Action dated Dec. 15, 2005 in U.S. Appl. No. 10/155,680.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 2, 2006 in U.S. Appl. No. 09/906,467.
U.S. Official Action dated Feb. 16, 2006 in U.S. Appl. No. 10/184,298.
U.S. Official Action dated Feb. 24, 2006 in U.S. Appl. No. 10/154,630.
U.S. Appl. No. 11/396,937, filed Apr. 3, 2006, entitled "Automatically Adding Proper Names to a Database".
U.S. Official Action dated Apr. 5, 2006 in U.S. Appl. No. 10/377,258.
U.S. Official Action dated Apr. 10, 2006 in U.S. Appl. No. 10/179,810.
U.S. Official Action dated Apr. 17, 2006 in U.S. Appl. No. 10/179,438.
U.S. Official Action dated Apr. 17, 2006 in U.S. Appl. No. 10/184,190.
U.S. Official Action dated May 26, 2006 in U.S. Appl. No. 09/588,411.
U.S. Official Action dated May 31, 2006 in U.S. Appl. No. 10/141,712.
U.S. Official Action dated Jun. 1, 2006 in U.S. Appl. No. 10/366,141.
U.S. Final Official Action dated Jul. 19, 2006 in U.S. Appl. No. 09/906,552.
U.S. Official Action dated Aug. 2, 2006 in U.S. Appl. No. 10/731,899.
U.S. Final Official Action dated Aug. 18, 2006 cited in U.S. Appl. No. 09/907,418.
U.S. Official Action dated Sep. 7, 2006 cited in U.S. Appl. No. 10/155,680.
U.S. Official Action dated Sep. 28, 2006 cited in U.S. Appl. No. 10/608,267.
U.S. Final Official Action dated Oct. 5, 2006 cited in U.S. Appl. No. 09/841,266.
U.S. Official Action dated Oct. 6, 2006 cited in U.S. Appl. No. 10/140,544.
U.S. Official Action dated Oct. 10, 2006 cited in U.S. Appl. No. 09/841,265.
European Communication dated Apr. 19, 2006 in EP 05 000 506.5-1527.
U.S. Final Office Action dated Oct. 19, 2006 cited in U.S. Appl. No. 09/906,467.
European Communication dated Sep. 25, 2006 in EP 03 01 4181.
World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.
World Wide Web Consortium, "Document Object Model (DOM) Level 2 Core Specification, Version 1.0", http://www.w3.org/TR/2000/REC-DOM-Level-2-Core-20001113/DOM2-Core.pdf, Nov. 2000, 107 pp.
European Communication dated Nov. 9, 2006 in EP 03010292.5.
"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pgs.
"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pgs.
U.S. Office Action dated Nov. 9, 2006 cited in U.S. Appl. No. 10/184,298.
U.S. Office Action dated Nov. 15, 2006 cited in U.S. Appl. No. 10/179,438.
U.S. Official Action dated Dec. 20, 2006 in U.S. Appl. No. 10/154,630.
U.S. Final Official Action dated Dec. 26, 2006 in U.S. Appl. No. 10/179,810.
U.S. Official Action dated Jan. 5, 2007 in U.S. Appl. No. 10/183,717.
U.S. Official Action dated Jan. 11, 2007 in U.S. Appl. No. 10/184,190.
U.S. Official Action dated Jan. 25, 2007 in U.S. Appl. No. 10/608,267.
European Communication dated Nov. 17, 2006 in EP 03 011 851.7-2211.
European Communication dated Dec. 11, 2006 in EP 03 012 830.0-2211.
Singapore Search Report/Written Opinion dated Jan. 26, 2007 in SG 200500214-2.
U.S. Official Action dated Feb. 6, 2007 cited in U.S. Appl. No. 09/588,411.
U.S. Official Action dated Feb. 7, 2007 cited in U.S. Appl. No. 10/179,438.
U.S. Official Action dated Feb. 21, 2007 cited in U.S. Appl. No. 10/366,141.
European Communication dated Feb. 16, 2007 cited in European Application No. 04 003 683.2-2211.
Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.
Rice, F.C., "Transform XML Files with XSLT When Importing into Microsoft Excel 2002," Jul. 2001, Internet article, XP-002420701, http://msdn2.microsoftcom/en-us/library/aa140055(office.10.d=printer).aspx, 9 pgs.
Johnson, L., "What's So Special About Paste Special?", Jun. 2002, Internet article, XP-002420702, http://pubs.logicalexpressions.com/Pub0009/LPMArticle.asp?ID=40, 5 pgs.
Anonymous, "Moving and Copying Text Tutorial," Aug. 17, 2001, Internet Article, XP-002307566, http://tutorials.findtutorials.com/read/category/102/id/342/p/3, 4 pgs.

(56) References Cited

OTHER PUBLICATIONS

U.S. Official Action dated Mar. 9, 2007 cited in U.S. Appl. No. 10/426,446.
U.S. Official Action dated Mar. 12, 2007 cited in U.S. Appl. No. 10/141,712.
U.S. Official Action dated Apr. 10, 2007 cited in U.S. Appl. No. 09/907,418.
U.S. Official Action dated May 14, 2007 cited in U.S. Appl. No. 09/906,552.
U.S. Final Official Action dated May 18, 2007 cited in U.S. Appl. No. 10/155,680.
U.S. Official Action dated May 30, 2007 cited in U.S. Appl. No. 09/906,467.
U.S. Final Official Action dated Jun. 15, 2007 cited in U.S. Appl. No. 10/731,899.
Blaheta et al., "Assigning Function Tags to Parsed Text," Morgan Kaufmann Publishers Inc., 2000, pp. 234-240.
U.S. Office Action dated Jun. 28, 2007 cited in U.S. Appl. No. 09/841,266.
U.S. Final Office Action dated Jul. 12, 2007 cited in U.S. Appl. No. 10/184,298.
U.S. Office Action dated Jul. 13, 2007 cited in U.S. Appl. No. 10/154,630.
U.S. Office Action dated Jul. 20, 2007 cited in U.S. Appl. No. 09/841,265.
U.S. Office Action dated Aug. 10, 2007 cited in U.S. Appl. No. 10/179,810.
U.S. Office Action dated Sep. 10, 2007 cited in U.S. Appl. No. 10/179,438.
U.S. Final Office Action dated Sep. 27, 2007 cited in U.S. Appl. No. 10/608,267.
Malaysian Search Report dated Aug. 2, 2007 cited in Malaysian Application No. PI 20040265.
U.S. Office Action dated Oct. 9, 2007 cited in U.S. Appl. No. 10/183,317.
U.S. Final Office Action dated Oct. 16, 2007 cited in U.S. Appl. No. 09/907,418.
U.S. Office Action dated Oct. 17, 2007 cited in U.S. Appl. No. 10/155,680.
U.S. Final Office Action dated Oct. 19, 2007 cited in U.S. Appl. No. 10/184,190.
U.S. Final Office Action dated Oct. 19, 2007 cited in U.S. Appl. No. 09/588,411.
U.S. Final Office Action dated Oct. 19, 2007 cited in U.S. Appl. No. 10/141,712.
U.S. Final Office Action dated Oct. 30, 2007 cited in U.S. Appl. No. 09/906,552.
European Communication dated Sep. 25, 2007 cited in European Application No. 03 014 181.6-1243.
Japanese Official Action dated Oct. 19, 2007 cited in Japanese Application No. 2003-128417.
Rubin, Charles, "Microsoft Word 2000 Official Manual," First Edition, Nikkei BP Soft Press, Inc., Aug. 2, 1999, pp. 215-217.
U.S. Final Office Action dated Dec. 7, 2007 cited in U.S. Appl. No. 10/426,446.
Russian Official Action dated Oct. 11, 2008 cited in Russian Application No. 2003118722.
Pershikov, V.I., "Explanatory Dictionary in Informatics," Finances and Statistics, Moscow, 1991 (in Russian with translated sections) 5 pgs.
U.S. Final Office Action dated Dec. 18, 2007 cited in U.S. Appl. No. 10/366,141.
U.S. Final Office Action dated Dec. 26, 2007 cited in U.S. Appl. No. 09/841,265.
U.S. Office Action dated Dec. 26, 2007 cited in U.S. Appl. No. 10/377,258.
U.S. Final Office Action dated Jan. 7, 2008 cited in U.S. Appl. No. 10/179,438.
U.S. Final Office Action dated Jan. 9, 2008 cited in U.S. Appl. No. 09/906,467.
David D. Lewis et al., "A Sequential Algorithm for Training Text Classifiers," Spring-Verlag New York, Inc., 1994, pp. 1-10.
U.S. Office Action dated Jan. 25, 2008 cited in U.S. Appl. No. 10/608,267.
U.S. Office Action dated Feb. 8, 2008 cited in U.S. Appl. No. 10/141,712.
U.S. Office Action dated Feb. 15, 2008 cited in U.S. Appl. No. 10/731,899.
U.S. Final Office Action dated Feb. 20, 2008 cited in U.S. Appl. No. 10/154,630.
Singapore Examination Report (conducted by Austrian Patent Office) dated Jan. 25, 2008 in SG Application No. 200500214-2.
Chinese Official Action dated Jan. 4, 2008 cited in Chinese Application No. 200510009487.0.
Chinese Official Action dated Dec. 28, 2007 cited in Application No. 200410005390.8.
Wei Ying-bin et al., "A New Technology ColdFusion of Realizing Dynamic Webpage," 2000, 6 pgs. (English language translation, pp. 1-6).
European Examination Report dated Mar. 4, 2006 cited in EP Application No. 02 014 717.9-1527.
European Examination Report dated Mar. 4, 2006 cited in EP Application No. 03 012 432.5-1527.
Russian Official Action dated Jan. 11, 2008 cited in Russian Application No. 2004105880/09(006292).
V. Doroth et al., "Modern Computer Vocabulary," St. Petersburg, BHV-Peterburg, 2001, p. 465 (with English language translation).
Mexican Official Action dated Feb. 11, 2009 cited in Application No. Pa/a/2003/005451.
Chinese Final Rejection dated Mar. 13, 2009 cited in Application No. 03145242.6.
Japanese Final Rejection dated Mar. 17, 2090 cited in Application No. 2004-037158.
Japanese Final Rejection dated Apr. 3, 2009 cited in Application No. 2002-207514.
C. Goldfarb, XML Handbook, $1^{st}$ Ed., Pearson Education, Japan, May 10, 1999, pp. 246-254 (no English translation).
S. Tanaka, "Verifying the XML Schema Definition," XML Magazine, Shoeisha Co., Ltd., vol. 10, No. 3, Jul. 1, 2000, pp. 135-155 (no English translation).
U.S. Office Action dated Apr. 20, 2009 cited in U.S. Appl. No. 10/426,446.
U.S. Office Action dated Apr. 27, 2009 cited in U.S. Appl. No. 10/154,630.
U.S. Official Action mailed Apr. 1, 2008 cited in U.S. Appl. No. 09/907,418.
U.S. Official Action mailed Apr. 4, 2008 cited in U.S. Appl. No. 10/155,680.
U.S. Official Action mailed Apr. 29, 2008 cited in U.S. Appl. No. 09/588,411.
U.S. Final Official Action mailed Apr. 29, 2008 cited in U.S. Appl. No. 10/179,810.
U.S. Official Action mailed May 1, 2008 cited in U.S. Appl. No. 10/183,317.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
Japanese Notice of Final Rejection dated May 28, 2010 cited in Application No. 2003-161338.
Australian Examiner's First Report dated Aug. 16, 2010 cited in Application No. 2009202563.
Polish Official Notice dated Aug. 25, 2009 cited in Application No. P.365553/DP.
Australian Official Action dated Sep. 11, 2009 cited in Application No. 2003204478.
Norwegian Official Action dated Aug. 24, 2009 cited in Application No. 2003 2550.
Polish Official Notice dated Sep. 22, 2009 cited in Application No. P. 364854/DP.
Polish Official Notice dated Sep. 23, 2009 cited in Application No. P. 360520/DP.

(56) References Cited

OTHER PUBLICATIONS

Korean Official Action dated Sep. 30, 2009 cited in Application No. 10-2003-40988.
Japanese Official Notice of Final Rejection dated Oct. 2, 2009 cited in Application No. 2003-162911.
"The Spatial Smart Tag", Geomatic Technologies, Mar. 10, 2005, 2 pp.
Harmon, D., "Microsoft MapPoint 2002", Geoworld Quick-Take Reviews, Aug. 2001, 3 pp.
Irie R. et al., "Resources for Place Name Analysis", May 28, 2004, 4 pp.
Rajabifard, A. et al., "Creating an Enabling Platform for the Delivery of Spatial Information", Spatial Sciences Institute Biennial Conference, Sep. 12, 2005, 10 pp.
Camarda, B., Special Editing Using® Microsoft® Office Word 2003, Que, Dec. 12, 2003, pp. 1-5.
Ivens, K., Office XP Smart Tags, Microsoft, Mar. 6, 2002, pp. 1-4.
Frye, C., Microsoft Office Systems: Step by Step, Microsoft Press, 2003 Edition, Sep. 3, 2003, pp. 1-6.
U.S. Official Action mailed Sep. 8, 2006 in U.S. Appl. No. 10/948,948.
U.S. Official Action mailed Feb. 15, 2007 in U.S. Appl. No. 10/948,948.
U.S. Official Action mailed Oct. 18, 2007 in U.S. Appl. No. 10/948,948.
U.S. Official Action mailed Mar. 20, 2008 in U.S. Appl. No. 10/948,948.
U.S. Official Action mailed Oct. 16, 2008 in U.S. Appl. No. 10/948,948.
U.S. Official Action mailed Oct. 16, 2008 in U.S. Appl. No. 10/154,630.
European Search Report dated Dec. 12, 2006 in European Application No. 05 105 000.3-1527.
European Examination Report dated Oct. 9, 2007 in European Application No. 05 105 000.3-1527.
European Preliminary Opinion dated Aug. 27, 2008 cited in European Application No. 04002224.6-1527 / 1447754.
Chinese Official Action dated Dec. 7, 2007 in Chinese Application No. 200510088529.4.
Chinese Second Official Action dated Aug. 15, 2008 in Chinese Application No. 200510088529.4.
Chilean Second Office Action cited in Chilean Application No. 67/2005 (date unknown).
Malaysian Official Action dated Aug. 29, 2008 cited in Malaysian Application No. PI 20031902.
Polish Official Action dated Aug. 27, 2008 in Polish Application No. P360520.
Korean Notice of Preliminary Rejection dated Aug. 23, 2010 cited in Application No. 10-2004-0013354.
Canadian Office Action dated Aug. 30, 2010 cited in Application No. 2,433,472.
Korean Notice of Preliminary Rejection dated Aug. 31, 2010 cited in Application No. 10-2004-9346.
Polish Official Letter dated Jun. 24, 2008 cited Polish Application No. P 365553.
U.S. Final Office Action dated Jul. 29, 2008 cited in U.S. Appl. No. 10/141,712.
"XML Schema Part 2: Datatypes," W3C, May 2, 2001, http://www.w3.org/TR/2001/REC-xmlschema-2-20010502/, pp. 1-146 (separated into 2 documents—A & B).
U.S. Office Action dated Aug. 1, 2008 cited in U.S. Appl. No. 10/366,141.
Ghamrawi et al., "Collective Multi-Label Classification," ACM, 2005, pp. 195-200.
Polish Official Action dated Jul. 21, 2008 cited in Polish Application No. P 364854.
Japanese Office Action dated Jul. 18, 2008 cited in Japanese Application No. 2002-207514.
Chinese Decision on Rejection dated Jul. 3, 2009 cited in Application No. 03143003.1.
European Summons to Attend Oral Proceedings dated Aug. 5, 2009 cited in Application No. 03003931.7.
Japanese Official Action dated May 26, 2009 cited in Application No. 2005-039754.
Rubin, C., "Microsoft Word 2000 Official Manual", First Edition, Nikkei BP Soft Press, Inc., Aug. 2, 1999, pp. 215-217.
U.S. Office Action dated May 27, 2008 cited in U.S. Appl. No. 09/906,552.
U.S. Examiner's Answer BPAI dated Jun. 5, 2008 cited in U.S. Appl. No. 10/184,298.
U.S. Office Action dated Jun. 11, 2008 cited in U.S. Appl. No. 09/841,265.
U.S. Office Action dated Jun. 12, 2008 cited in U.S. Appl. No. 10/426,446.
U.S. Office Action dated Jun. 13, 2008 cited in U.S. Appl. No. 10/780,376.
U.S. Final Office Action dated Jun. 27, 2008 cited in U.S. Appl. No. 10/377,258.
M. Stowe, "XML in Excel and the Spreadsheet Component", Microsoft Corporation, Aug. 2001, 6 pgs.
C. Heinemann, "Cross-Reference your XML Data", Microsoft Corporation, Dec. 7, 1998, 6 pgs.
D. Obasanjo, "XML_Namespaces and How They Affect Xpath and XSLT", Microsoft Corporation, May 20, 2002, 19 pgs.
European Communication Summons to Attend Oral Proceedings dated May 7, 2008 cited in European Application No. 04002224.6.
Russian Official Action dated Mar. 13, 2008 cited in Russian Application No. 2004104096/09(004398).
Japanese Official Action dated Mar. 28, 2008 cited in Japanese Application No. 2003-178497.
Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.
European Communication dated Jun. 3, 2008 cited in European Application No. 03 011 851.7-2211.
Japanese Official Action dated Apr. 18, 2008 cited in Japanese Application No. 2003-128417.
European Communication Minutes of Oral Proceedings and Decision dated Sep. 15, 2008 in European Application No. 05 000 506.5-1527.
Polish Second Official Action dated Oct. 28, 2008 in Polish Application No. P36553.
U.S. Office Action dated Oct. 22, 2009 cited in U.S. Appl. No. 10/377,258.
Japanese Official Notice of Final Rejection dated Oct. 27, 2009 cited in Application No. 2003-161338.
Japanese Notice of Rejection dated Nov. 12, 2010 cited in Application No. 2003-161338.
Russian Official Action dated Jun. 21, 2009 cited in Application No. 2005104223/09(005505).
D. Richter, "Windows for professionals" (Win32 API programming for Windows NT 3.5 and Windows 95, translation from English, Moscow: Russian Edition, 1995, ISBN 5-7502-0010-8, pp. 26, 31, 215.
U.S. Final Office Action dated Nov. 30, 2009 cited in U.S. Appl. No. 10/179,810.
Glover et al., "Inferring hierarchical Descriptions," ACM, 2002, pp. 507-514.
Japanese Office Action dated Oct. 10, 2008 cited in Application No. 2004-037158.
Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53.
Chinese Office Action dated Oct. 17, 2008 cited in Application No. 03145242.6.
U.S. Final Office Action dated Dec. 8, 2008 cited in U.S. Appl. No. 10/183,317.
Canadian Official Action dated Dec. 15, 2010 cited in Application No. 2,431,667.
Canadian Official Action dated Dec. 16, 2010 cited in Application No. 2,431,104.

(56) References Cited

OTHER PUBLICATIONS

Japanese Final Official Action dated Dec. 14, 2010 cited in Application No. 2005-175170.
Chinese Final Rejection dated Dec. 21, 2010 cited in Application No. 03143003.1.
Japanese Interrogation dated Jan. 7, 2011 cited in Application No. 2003-178497.
Indian Official Action dated Dec. 13, 2010 cited in Application No. 557/MUM/2003.
Japanese Notice of Rejection mailed Jul. 8, 2011 cited in Application No. 2003-178497.
Japanese Appeal Decision mailed Aug. 12, 2011 cited in Application No. 2008-31101.
Canadian Official Action mailed Aug. 26, 2011 cited in Application No. 2,431,104.
Taiwan Official Action mailed Jul. 28, 2011 cited in Application No. 93103386.
Japanese Official Action dated Apr. 28, 2011 cited in Appl. No. 2003-128417.
Japanese Appeal Decision of Rejection dated Sep. 16, 2011 cited in Appl. No. 2003-128417.
European Examination Report dated Oct. 18, 2011 cited in Appl. No. 03 011 851.7-2211.
European Examination Report dated Oct. 25, 2011 cited in Appl. No. 03 014 181.6.
Canadian Examiner's Report mailed Mar. 2, 2012 cited in Application No. 2,456,771.
Malaysian Substantive Examination Clear Report dated Jun. 19, 2012 in PI 20040265.
Canadian Examiner's Report dated Jul. 26, 2012 in 2,456,711.
Chinese Third Office Action mailed Apr. 12, 2012 cited in Application No. 03143003.1.
U.S. Office Action dated May 24, 2012 cited in U.S. Appl. No. 12/777,322, 65 pgs.
Peng et al., "Accessing existing business data from the World Wide Web," IBM Systems Journal, vol. 37, No. 1, 1998, pp. 115-132.
Indian Official Action dated Apr. 11, 2013 in 170/DEL/2004.

\* cited by examiner

Fig. 1

PROVIDING CONTEXTUALLY SENSITIVE TOOLS AND HELP CONTENT IN COMPUTER-GENERATED DOCUMENTS

RELATED APPLICATIONS

This application is a continuation of application Ser. No. 10/164,960, filed Jun. 6, 2002, now U.S. Pat. No. 7,356,537 which is incorporated herein by reference.

TECHNICAL FIELD

This invention relates to the provision of contextually sensitive tools and help content in computer-generated documents.

BACKGROUND OF THE INVENTION

Computer software applications allow users to create a variety of documents to assist them in work, education, and leisure. For example, popular word processing applications allow users to create letters, articles, books, memoranda, and the like. Spreadsheet programs allow users to store, manipulate, print, and display a variety of alpha-numeric data. Such applications have a number of well-known strengths, including rich editing, formatting and calculation.

However, documents created by such software applications do not provide users with contextually sensitive tools, help content, or support. That is, as the user is entering text or data into such software applications, these applications do not provide the user with helpful tools or assistance based on the context of the text or data being entered by the user. Internet web-based applications attempt to solve some business problems through the creation and deployment of web-based templates with which users may enter information that may be transmitted to a back-end web server for the purpose of registering the user for some type of service. Such web-based applications often may include links with which the user may navigate to a separate web site for helpful information or assistance with the current web-based application or document in use by the user. However, such web-based applications suffer compared to the aforementioned software application documents in that modern web-based applications seldom offer rich editing, formatting, printing, and calculation.

By way of example, in a typical setting, a user may decide to prepare a resume using a word processing application loaded on her home computer. As the user prepares the resume, she likely will fill in such sections such as "personal information," "education," "experience," and "extra-curricular activities." As the user is completing each of those sections, she may require assistance, including information on the preferred ordering of the sections, information on the preferred number of past jobs to place in the "experience" section, and the like. In order to receive such assistance, the user likely must read a book on resumes, or go online to an internet-based resume help site for the information.

In contrast, the user may enter an internet-based resume site to complete a resume using a web-based resume template. The user may be allowed to enter specific information in given data fields, and the user may be provided with internet web site links for navigating to sites where she may obtain assistance with various sections of the document. When the user has completed preparation of the web-based resume, the user may be allowed to submit the resume to some web-based job service, or the user may be able to print the template. However, the functionality of the user's word processing application, such as rich editing and formatting of the resume, is likely not available to the user given the limitations of the web-based application in contrast to the user's computer-based word processor.

It is with respect to these and other considerations that the present invention has been made.

SUMMARY OF THE INVENTION

The present invention provides a method and system for creating, implementing and using computer-generated documents that provide contextually sensitive tools, controls and help content to the user(s) of those documents. Generally described, a schema is attached to a document defining permissible data content, data type and data structure for the document. The document is structured to associate the document with the schema, and a solution is associated with the document structure. A plurality of software components is assembled for providing the solution to the document, and the document is enabled to call the plurality of software components for providing the solution to the document based on an editing position in the document.

After the document is created, a software application for opening the document may be booted to initiate opening the document. A determination is made as to whether the document refers to the solution. A determination is made as to whether the plurality of software components for providing the solution is present in a library of software components. If so, the plurality of software components is called for providing the solution to the document.

Once the document is opened for use, focusing document editing in a particular portion of the document, such as by placing the cursor in a particular portion of the document, causes the generation of a list of Extensible Markup Language (XML) elements enclosing a position of the editing focus. A determination is made as to whether any available solutions are associated with the list of XML elements. If any available solutions are associated with the list of XML elements, each associated solution is called and is obtained for use by the document. Preferably, the solutions comprise help content and document tools associated with the context of the editing position in the document. A graphical user interface is launched for displaying each solution obtained for use by the document.

These and other features, advantages, and aspects of the present invention may be more clearly understood and appreciated from a review of the following detailed description of the disclosed embodiments and by references to the appended drawings and claims.

BRIEF DESCRIPTION OF THE DRAWINGS

FIG. 1 is a computer screen display of a software application graphical user interface through which is displayed a document and associated contextually sensitive tools and help content according to an embodiment of the present invention.

DETAILED DESCRIPTION

Figure 2:
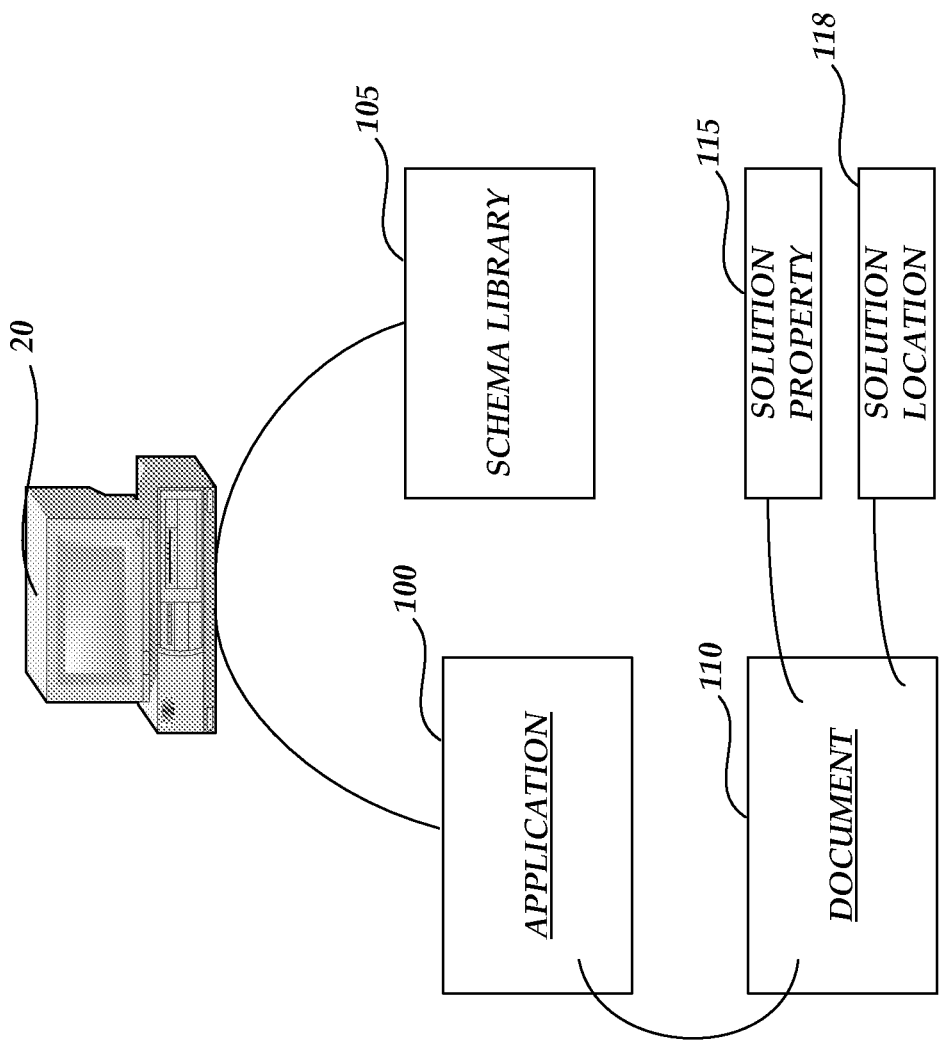
FIG. 2 is a block diagram illustrating client-side software architecture for use in conjunction with an embodiment of the present invention.

The present invention is directed toward creation, implementation and use of computer-generated "smart" documents to which functionality is attached for providing contextually sensitive tools, help content and controls to users of those documents. According to an embodiment of the invention, portions of documents are structured so that when a user enters those portions, such as by placing a computer cursor in those portions, the document points to a solution that may provide the user contextually sensitive tools and/or help content. For example, if a user is preparing a resume to assist her in obtaining a job, the user may place her computer cursor in the "education" section the resume. According to the present invention, the placement of computer cursor in the "education" section may provide the user with contextually sensitive information. The document may point to an overall solution, e.g., a resume document solution, or individual portions of the document may point to contextual subsets of the solution, e.g., and "experience" section solution of a resume document solution. A document tools pane may open on the user's computer screen adjacent to the document being edited and may provide a narrative on suggested approaches for the completion of the "education" section. If the user moves the cursor to another portion of the document, for example to the "objectives" section of the resume, the user may obtain information associated with that context, such as examples of proper employment objectives statements.

It should be understood that the contextually sensitive tools and help content provided to a user in accordance with an embodiment of the present invention may be provided for a variety of software application programs, including word processors, spreadsheets, web browsers, text editors, and the like. Moreover, the types and content of helpful information and tools provided to a user according to an embodiment of the present invention may include a variety of tools and actions and help information as desired by the creator of the software applications in use by the user.

Figure 1:
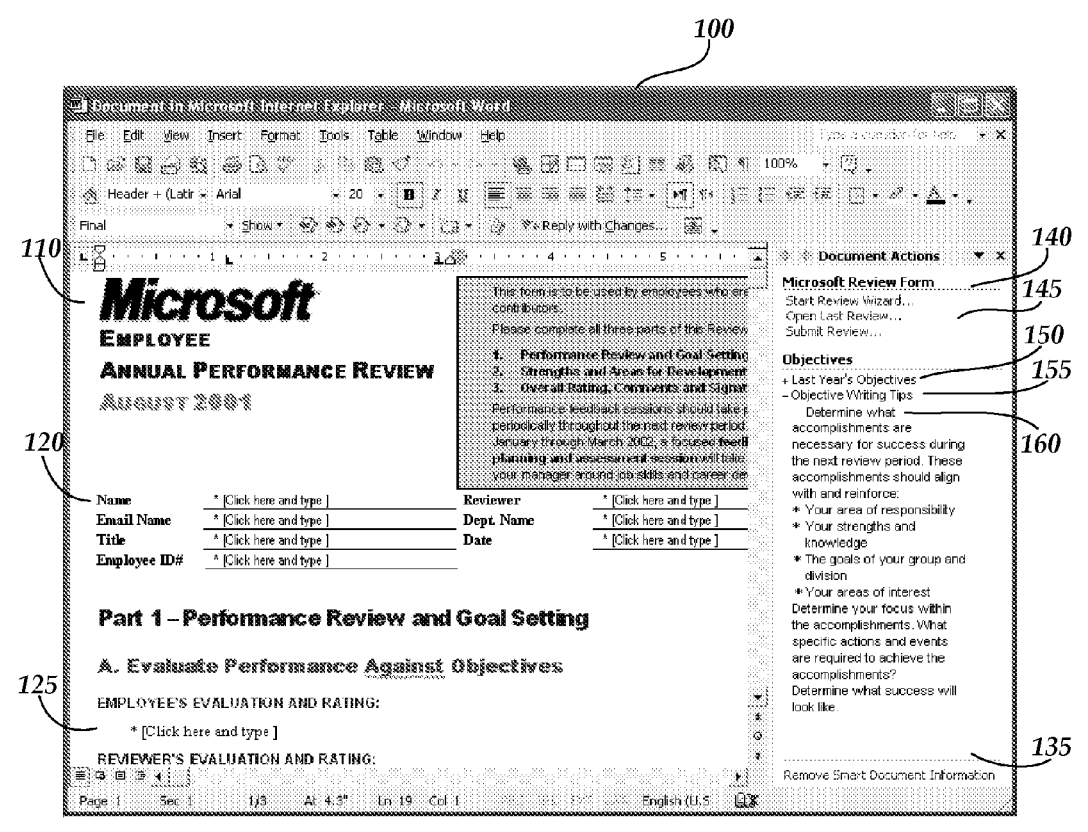

Referring to FIG. 1, a computer screen display is illustrated showing an exemplary software application 100 with which a document and associated document tools pane providing document tools and help content is illustrated. The document 110 depicted in FIG. 1 shows an employee annual performance review template with which an employ may complete her annual performance review or with which she may complete a performance review of one of her employees. The application 100 depicted in FIG. 1 is a word processing application used for displaying and editing the document 110, but as should be understood by those skilled in the art, the application 100 could include other software applications, including spreadsheet applications, text editing applications, and the like. Moreover, the document 110 illustrated in FIG. 1 depicts an annual performance review document, but the document 110 could include a variety of other documents and templates edited by the user, including resume templates, will templates, desktop publishing documents, letters, financial spreadsheets, and the like.

Referring to the exemplary document shown in FIG. 1, the word processing application 100 provides typical functionality associated with a word processor, accessible via drop down menus such as, File, Edit, View, Insert, Format, etc. The document 110 is displayed in the work area of the application 100, and a document tools pane 135 is illustrated to the right of the document 110. As should be understood, the display illustrated in FIG. 1 is by way of example only, and the components illustrated in FIG. 1 may be organized in a variety of different ways pleasing to the user. That is, the document tools pane may be located on the bottom of the screen display, to the left of the document 110, or according to other orientations allowed by the application 100.

A detailed discussion of the creation and implementation of the "smart" document 110 illustrated in FIG. 1 follows below, but generally described according to an embodiment of the present invention, once the user places her computer cursor within a particular section of the document 110, for example the "objectives" section 125 illustrated in FIG. 1, the user is provided with tools and help content in the document tools pane 135. For example, if the user places her computer cursor in the "objectives" section 125, the user may be provided with "Objective Writing Tips" 155 shown in the document tools pane 135. Selection of the "Objective Writing Tips" 155, as illustrated in FIG. 1, causes a display of "Objective Writing Tips" text 160 that provide the user with helpful information as to how to complete the "objectives" section the performance review document 110, illustrated in FIG. 1. If the user moves the cursor to a different section of the document, for example the personal information section 120, information provided in the document tools pane 135 will be provided to give the user assistance with the completion of the personal information section 120.

In addition to helpful information to assist the user, a variety of document tools and actions 145 are provided. For example, the "Submit Review" action may allow the user to submit the completed document 110 to her supervisor or to her employee after completion of the document. The "Open Last Review" action may allow the user to open the last performance review so that she may determine whether she completed her objectives as set forth in the last review. If the document in use by the user is some other type of document, for example a resume document, helpful information in the document tools pane might include information on preparing the "education" section, the "experience" section, and/or the "personal information" section. A will document 110 might be associated with helpful information regarding legal rules for preparation of wills, rules regarding estate beneficiaries, and the like.

In addition to the document actions and help content illustrated in the pane 135, a variety of document controls may be provided, including radio buttons, text boxes, check boxes, ActiveX controls, XML tree controls, and the like. For example, a text box may be provided to allow a user to select from a list of pre-written text items. Or, the user may be allowed to enter text in a list box provided in the pane 135 that will then be inserted into the document or used by the application with respect to some other functionality of the application. A radio button or check box may be provided to allow the user to select from different choices of document actions or help content. For example, if the document is a will, check boxes may be provided with which the user may select "married," "single," etc., to obtain help information based on the user's personal will and estate profile.

Referring to FIG. 2, a general system architecture for creating and utilizing a "smart" document 110 in accordance with the present invention is illustrated. A software application 100, as described above, is opened on the user's computer 20 to create or edit a document 110 according to the present invention. A schema library 105 is provided for containing all of the executable files required for providing the contextually sensitive functionality to the document 110. For example, the schema library may include a variety of components, including individual modular software routines that have been compiled and dynamically linked and that are ready to use by the application 100 for providing contextually sensitive functionality to the document 110.

Such components may include a number of dynamically-linked libraries (dll), which include executable files or routines stored separately from the software application 110. The dlls are loaded by the software application 100 only when they are needed to provide functionality to the document 110. Additionally, as described in detail below, the schema library 105 may include a number of Extensible Markup Language (XML) files for providing contextually sensitive functionality in association with XML structure that has been applied to the document 110.

A solution property 115 is included in the document 110 for pointing the document to a particular solution contained in the schema library 105. The solution location property 118 provides the document 110 and the application 100 with information as to the location of the solution property in the schema library or to a remote location provided via a distributed computing environment, such as is provided from a web-based server via the Internet.

According to the present invention, and as described in detail below, when a user focuses on a particular portion of the document 110, such as the "objectives" section of the performance review 110 illustrated in FIG. 1, a solution property 115 points the document to the "objectives" section help solution illustrated in the document tools pane 135. The solution location 118 provides the document 110 and the application 100 with the location of the components, dlls, or XML files necessary for implementing that solution. As should be understood, exemplary components may include components for drawing the document tools pane 135, components for displaying the information associated with the particular context, in this case the "objectives" section, and components for executing document actions such as "Submit Review" action 145.

Figure 3:
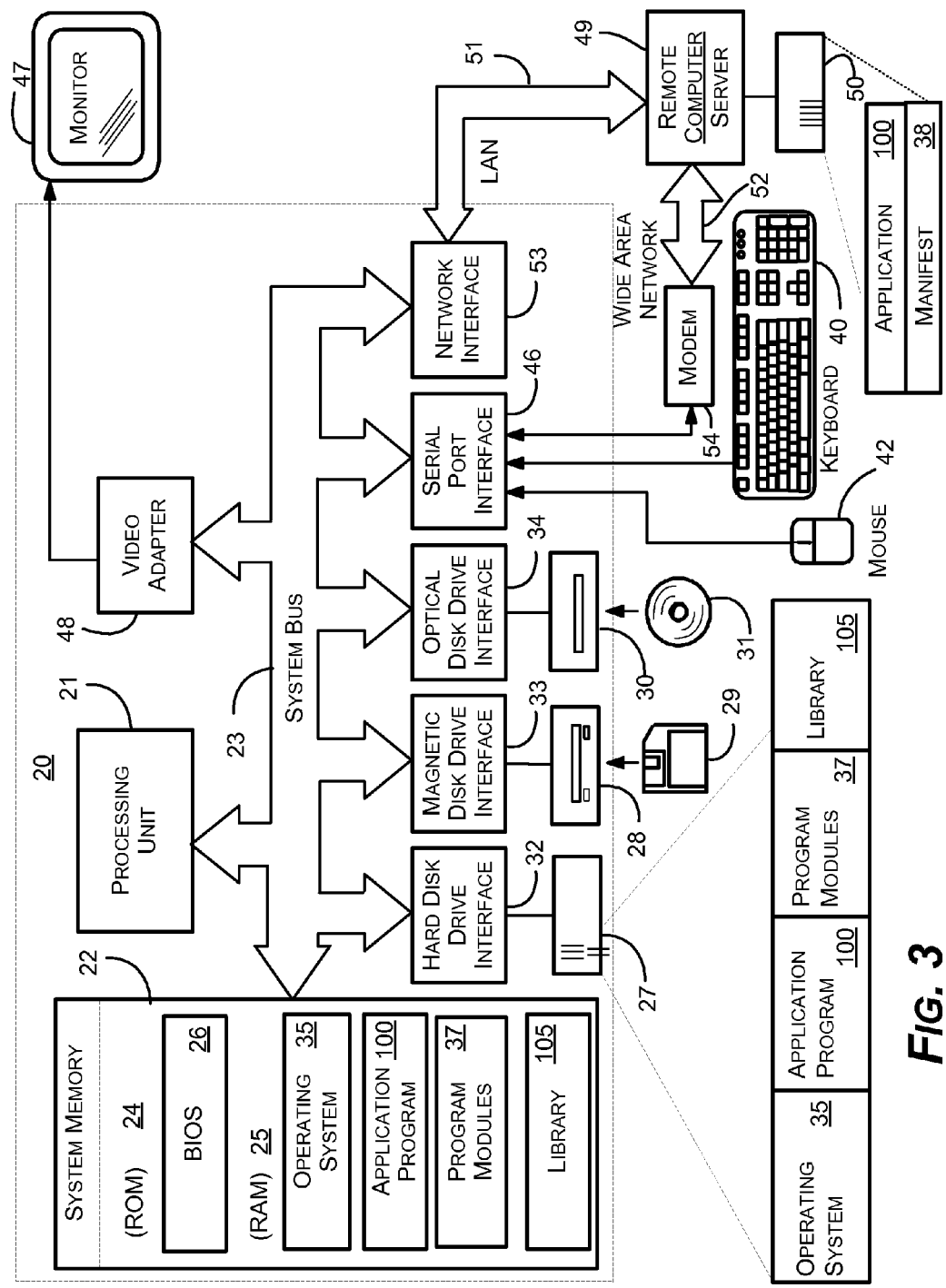
FIG. 3 is a block diagram of a computer and associated peripheral and networked devices that provide an exemplary operating environment for the present invention.

FIG. 3 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 3, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a word processor program module 37 (or other type of program module), program data, such as the manifest 38, and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 3. The logical connections depicted in FIG. 3 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 4:
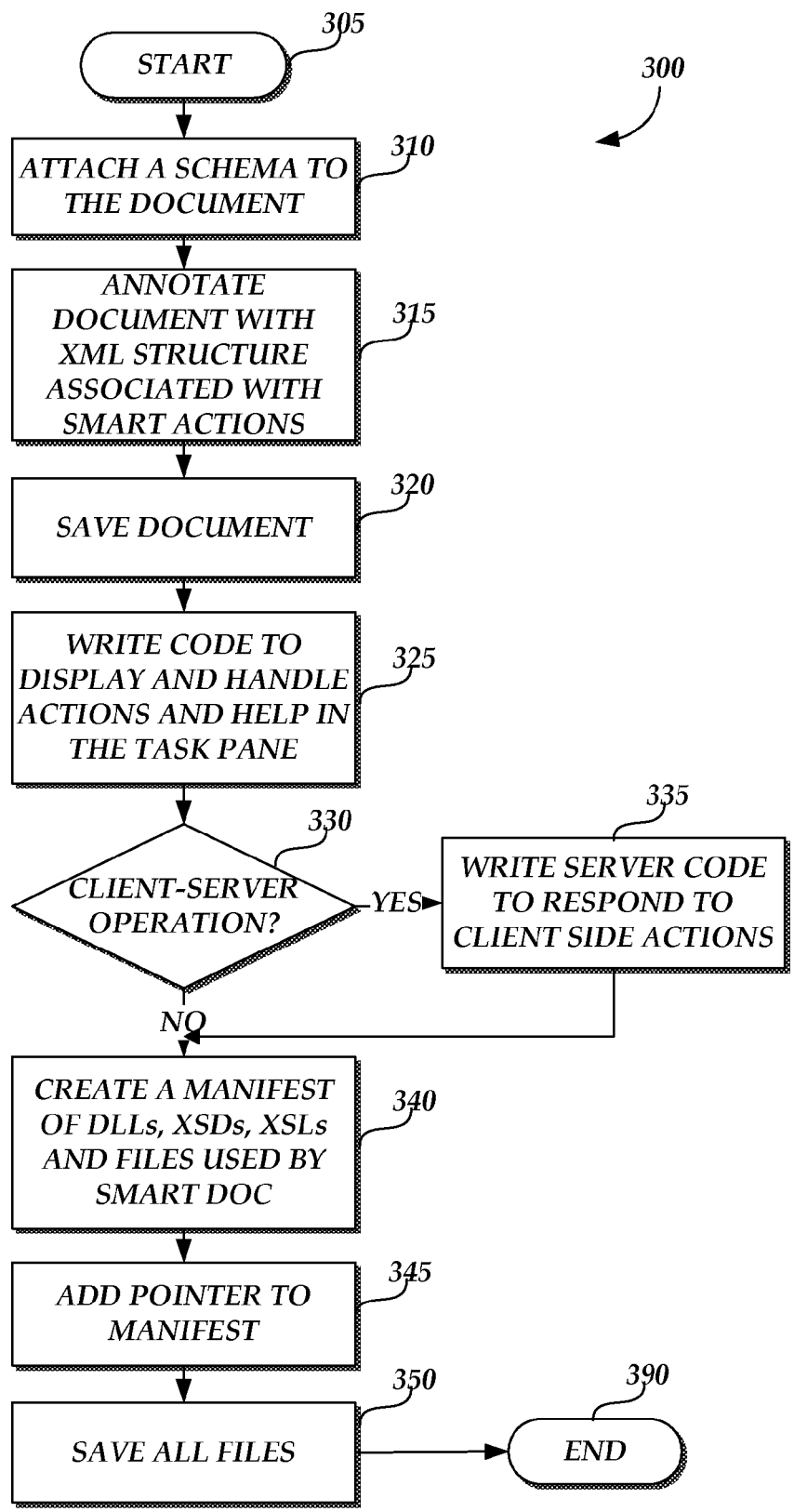
FIG. 4 is a flow chart illustrating a method for creating a document that provides contextually sensitive tools and help content according to an embodiment of the present invention.

FIG. 4 is a flow chart illustrating a method of creating a "smart" document 110 according to an embodiment of the present invention. The method 300 begins at start step 305 and proceeds to step 310 where an XML schema is attached to the document. As is understood by those skilled in the art, a schema sets up the grammar and rules associated with Extensible Markup Language (XML) tags applied to the document 110 to provide XML structure to the document 110. The schema attached to the document 110 illustrated in FIG. 1 may set out all of the grammatical, data type and data content rules allowed for tags associated with the document 110. For example, the "personal information" section 120, which includes the name, e-mail name, title, and employee identification for the employee, may have schema that requires that data entered into the "name" block must be in the form of "first name," followed by "middle name," followed by "last name."

As understood by those skilled in the art of Extensible Markup Language usage, once that portion of the document 110 is annotated with XML structure corresponding to the "name" element, for example, manipulation of data entered into that section of the document may be performed by software components without regard to the actual content of the data so long as the content was entered according to the schema prescribed for that portion of the document.

At step 315, the document 110 is annotated with XML structure that will be associated with tools and help functionality for providing contextually sensitive functionality to the document as described above. A simplified XML structure annotation for the employee review document 110 illustrated in FIG. 1 is as follows.

Sample XML Structure

```
<Employee Review>
    <Personal Information>
        <Name>
            <first_name>Joe</first_name>
            <last_name>Smith</last_name>
        </Name>
        <email Name>
            <email>Joe@Address.com</email>
        </email Name>
            *
            *
            *
</Employee Review>
```

The schema attached to the document 110 prescribes the data type and data structure rules entered within the XML document structure. As should be understood, the XML structure illustrated above is simplified in nature, and is provided for purposes of illustration only. A sample XML schema associated with the example XML structure above is as follows.

Sample Schema

```
<xsd:schema xmlns:xsd="http://www.w3.org/2001/XMLSchema"
xmlns="urn:reviewForm"
    targetNamespace="urn:reviewForm"
    elementFormDefault="qualified">
<xsd:annotation>
```

Sample Schema —continued

```
<xsd:documentation xml:lang="en">
    The schema for the August 2001 Microsoft employee review
    form.
</xsd:documentation>
</xsd:annotation>
<xsd:element name="Review" type="ReviewType" />
<xsd:complexType name="EmployeeManagerResponsesType">
    <xsd:all>
        <xsd:element name="EmployeeResponse"
        type="xsd:string" />
        <xsd:element name="ManagerResponse"
        type="xsd:string" />
    </xsd:all>
</xsd:complexType>
<xsd:simpleType name="RatingScore">
    <xsd:restriction base="xsd:decimal">
        <xsd:enumeration value="2.5" />
        <xsd:enumeration value="3.0" />
        <xsd:enumeration value="3.5" />
        <xsd:enumeration value="4.0" />
        <xsd:enumeration value="4.5" />
        <xsd:enumeration value="5.0" />
    </xsd:restriction>
</xsd:simpleType>
<xsd:complexType name="RatingType">
    <xsd:all>
        <xsd:element name="EmployeeRating"
        type="RatingScore" />
        <xsd:element name="EmployeeComments"
        type="xsd:string" />
        <xsd:element name="ManagerRating"
        type="RatingScore" />
        <xsd:element name="ManagerComments"
        type="xsd:string" />
    </xsd:all>
</xsd:complexType>
<xsd:complexType name="IdentityType">
    <xsd:all>
        <xsd:element name="Name" type="xsd:string" />
        <xsd:element name="Alias" type="xsd:string" />
        <xsd:element name="Title" type="xsd:string" />
        <xsd:element name="EmployeeID"
type="xsd:positiveInteger" />
        <xsd:element name="Reviewer" type="xsd:string" />
        <xsd:element name="Department" type="xsd:string" />
        <xsd:element name="Date" type="xsd:date" />
    </xsd:all>
</xsd:complexType>
<xsd:complexType name="ReviewType" mixed="true">
    <xsd:all>
        <xsd:element name="ReviewPeriod" type="xsd:string" />
        <xsd:element name="Identity" type="IdentityType" />
        <xsd:element          name="CurrentObjectives"
type="EmployeeManagerResponsesType" />
        <xsd:element               name="FutureObjectives"
type="EmployeeManagerResponsesType" />
        <xsd:element           name="StrengthsAndWeaknesses"
type="EmployeeManagerResponsesType" />
        <xsd:element name="Ratings" type="RatingType" />
    </xsd:all>
</xsd:complexType>
</xsd:schema>
```

At step 320, the document 110 is saved along with the associated document schema and XML structure.

At step 325, software programming code is written that is necessary to display and handle tools, controls and actions in the document tools pane 135 according to the position of the user's cursor within the document 110. The code written at step 325 includes all required XML files, including Extensible Style Sheet Language (XSL) files, including XSL transformations and XSL formatting objects. As understood by those skilled in the art, XSL transformations include files containing specific rules by which one XML document is transformed into another XML document. As should be understood by those skilled in the art, all XML files, including XML documents and XML transformation documents, are written for processing the document 110 as an XML-structured document.

According to one embodiment, an XML schema may be written to define a list of document actions, controls and help content that are associated with a solution or contextual subset of a solution that are correspondingly associated with XML structure (elements) in the document. The XML schema may be written using any editing tool or XML schema editing tool to create an instance of the schema. The XML schema may be written to include directly in the XML schema all of the properties of the schema and a list of the document actions, controls and help content to be displayed. An exemplary XML schema is set out above.

Other code written for the document 110 at step 325 includes all of the components, such as dynamic-link libraries (dll), needed by the application 100 and the document 110 for providing the contextually sensitive functionality to the document 110, as described with reference to FIG. 1. For example, a dll in the form of an application programming interface (API) may be written to call on a particular solution contained in the schema library 105 when the computer cursor is located by the user within a particular context of the document 110. That is, when the computer cursor is placed within a particular section or portion of the document 110, such as the "name" portion, an application program interface is included for finding the solution property 115 associated with the "name" portion of the document 110 and for calling that solution to provide document tools, actions and help content associated with the "name" portion of the document.

Other exemplary components that are written at step 325 include components for drawing the document tools pane 135 and for displaying textual information associated with the XML elements in the document 110 within which the computer cursor is presently located. Other components may include modular software routines for displaying an action, such as a "submit review" button, for allowing the user to submit the review to a third party, such as the user's employee or the user's supervisor. Still other components may be included for drawing and for providing functionality to controls, such as radio buttons, text boxes and check boxes, as described above with reference to FIG. 1. Any component object model add-ins that may be needed to provide functionality according to the present invention are also written at step 325. In addition to software components necessary providing the document tools and help functionality described herein, the actual text of help content that is drawn into the pane 135 is assembled for deployment when a corresponding help topic is called.

Controls, such as radio buttons, text boxes and check boxes, may be provided in the pane 135 without an associated schema being attached to the document. By declaring that a control is associated with a particular XML element, that control may be provided at the top of the pane 135 above other actions, controls and help topics prescribed by the schema. Similarly, a control may be provided immediately above all other items, including those described above, in the pane 135 by declaring that the control is associated with the entire schema for the document rather than to individual XML elements prescribed by the schema.

All of the aforementioned files, components, component add-ins, dlls, schema files, and XML files are assembled and stored for use by the application 100 in providing the contextually sensitive functionality of the document 110. The schema library 105 may be in the form of a database containing pointers to the aforementioned stored components that may be stored in the memory of the computer 20 in various locations, including the computer's registry.

According to embodiment of the present invention, an application programming interface (API) is provided for implementing the functionality of the present invention to provide a "smart" document solution to the document 110. The API includes properties and methods or instructions that are called upon when a particular action is initiated, for example, opening the document 110 that in turn points to a solution, as described above. Listed below is sample computer programming code for implementing the "smart" document API. The sample code listed below is not limiting of variations that may be made in computer programming code that may be written for implementing the API according to the present invention.

Sample Smart Document API

```
Implements ISmartDocument
    Private Sub ISmartDocument SmartDocInitialize(ByVal document As Object, ByVal bstrSolutionPath As String)
    Private Property Get ISmartDocument_SmartDocXMLTypeCount( ) As Long
    Private Property Get ISmartDocument_SmartDocXMLTypeName(ByVal smartDocID As Long) As String
    Private Property Get ISmartDocument_SmartDocXMLTypeCaption(ByVal smartDocID As Long, ByVal LocaleID As Long) As String
    Private Property Get ISmartDocument_ControlCount(ByVal SmartDocXMLTypeName As String) As Long
    Private Property Get ISmartDocument_ControlID(ByVal SmartDocXMLTypeName As String, ByVal ControlIndex As Long) As Long
    Private Property Get ISmartDocument_ControlTypeFromID(ByVal ControlID As Long, ByVal ApplicationName As String, ByVal LocaleID As Long) As C_TYPE
    Private Property Get ISmartDocument_ControlNameFromID(ByVal ControlID As Long) As String
    Private Property Get ISmartDocument_IsControlDynamic (ByVal ControlID As Long, ByVal ApplicationName As String, ByVal LocaleID As Long) As Boolean
    Private Property Get ISmartDocument_ControlCaptionFromID(ByVal ControlIDAs Long, ByVal ApplicationName As String, ByVal LocaleID As Long, ByVal bstrText As String, ByVal bstrXML As String, ByVal Target As Object) As String
    Private Sub ISmartDocument PopulateRadioGroup(ByVal ControlID As Long, ByVal ApplicationName As String, ByVal LocaleID As Long, ByVal bstrText As String, ByVal bstrXML As String, ByVal Target As Object, List( ) As String, count As Long, InitialSelected As Long)
    Private Sub ISmartDocument OnRadioGroupSelectChange(ByVal ControlID As Long, ByVal Target As Object, ByVal Selected As Long, ByVal Value As String)
    Private Sub ISmartDocument PopulateImage(ByVal ControlID As Long, ByVal ApplicationName As String, ByVal LocaleID As Long, ByVal bstrText As String, ByVal bstrXML As String, ByVal Target As Object, ImageSrc As String)
    Private Sub ISmartDocument_ImageClick(ByVal ControlID As Long, ByVal
    ApplicationName As String, ByVal Target As Object, ByVal Text As String, ByVal Xml As String, ByVal LocaleID As Long, ByVal XCoordinate As Long, ByVal YCoordinate As Long)
    Private Sub ISmartDocument PopulateDocumentFragment(ByVal ControlID As Long, ByVal ApplicationName As
```

String, ByVal LocaleID As Long, ByVal bstrText As String, ByVal bstrXML As String, ByVal Target As Object, DocumentFragment As String)

Private Sub ISmartDocument PopulateActiveXProps(ByVal ControlID As Long, ByVal ApplicationName As String, ByVal LocaleID As Long, ByVal bstrText As String, ByVal bstrXML As String, ByVal Target As Object, PropBag As SmartTagLib.IActiveXProperties)

Private Sub ISmartDocument PopulateCheckbox(ByVal ControlID As Long, ByVal ApplicationName As String, ByVal LocaleID As Long, ByVal bstrText As String, ByVal bstrXML As String, ByVal Target As Object, Checked As Boolean)

Private Sub ISmartDocument OnCheckboxChange(ByVal ControlID As Long, ByVal Target As Object, ByVal Checked As Boolean)

Private Sub ISmartDocument PopulateListOrComboContent(ByVal ControlID As Long, ByVal ApplicationName As String, ByVal LocaleID As Long, ByVal bstrText As String, ByVal bstrXML As String, ByVal Target As Object, List( ) As String, count As Long, InitialSelected As Long, IsEditable As Boolean, ControlOnSameLine As Boolean)

Private Sub ISmartDocument OnListOrComboSelectChange(ByVal ControlID As Long, ByVal Target As Object, ByVal Selected As Long, ByVal Value As String)

Private Sub ISmartDocument PopulateTextboxContent (ByVal ControlID As Long, ByVal ApplicationName As String, ByVal LocaleID As Long, ByVal bstrText As String, ByVal bstrXML As String, ByVal Target As Object, Value As String, ControlOnSameLine As Boolean)

Private Sub ISmartDocument_OnTextboxContentChange (ByVal ControlID As Long, ByVal Target As Object, ByVal Value As String)

Private Sub ISmartDocument_PopulateHelpContent(ByVal ControlID As Long, ByVal ApplicationName As String, ByVal LocaleID As Long, ByVal bstrText As String, ByVal bstrXML As String, ByVal Target As Object, Content As String)

Private Sub ISmartDocument_InvokeControl(ByVal ControlID As Long, ByVal ApplicationName As String, ByVal Target As Object, ByVal Text As String, ByVal Xml As String, ByVal LocaleID As Long)

A number of properties and methods are included in the API listed above. The SmartDocInitialize method includes routines and instructions executed when the API is called upon to provide "smart" document functionality to the docket 110. The SmartDocXMLTypeCount property includes the number of XML element types associated with the solution. The SmartDocXMLTypeName property includes unique identifiers for the XML element types associated with the "smart" document solution. The SmartDocXMLTypeCaption property includes captions associated with XML elements that may be included in a menu or pane such as the help pane 135.

The ControlCount property includes the number of controls associated with the "smart" document solution for a particular XML element type. The ControlID property includes unique identifiers for the controls. The ControlTypeFromID property includes the types of controls available for use with an associated solution, for example, radio buttons, textboxes, and check boxes. The ControlNameFromID property returns a name associated with each control for use internally by a given application program 100.

The PopulateRadioGroup method includes routines and instructions that are executed for populating radio control buttons within a menu or pane such as the help pane 135. The OnRadioGroupSelectChange method includes routines and instructions that are executed when a radio group (radio button) is selected or deselected.

The PopulateImage method includes routines and instructions that are executed for populating an image associated with a solution, such as an image populated within the help pane 135. The ImageClick method includes routines and instructions that are executed when an image is selected by a user.

The PopulateDocumentFragment method includes routines and instructions that are executed for populating the user interface with text or data. The PopulateActiveXProps method includes routines and instructions that are executed for obtaining ActiveX functionality associated with a document solution.

The PopulateCheckbox method includes routines and instructions for providing a checkbox control in a user interface such as the help pane 135. The OnCheckboxChange method includes routines and instructions that are executed when a checkbox control is selected or deselected by a user.

The PopulateListOrComboContent method includes routines and instructions that are executed to populate a list box control in a user interface such as the pane 135. The OnListOrComboSelectChange method includes routines and instructions that are executed upon the selection of an item in a list box control.

The PopulateTextboxContent method includes routines and instructions for populating a textbox in a user interface such as the pane 135. The OnTextboxContentChange method includes routines and instructions that are executed for handling an event associated with the change of content in a textbox control within a user interface such as the pane 135.

The PopulateHelpContent method includes routines and instructions for populating a help content field within the pane 135 with required text or data. The InvokeControl method includes routines and instructions that are executed when a control such as a radio button, textbox, or checkbox is selected or deselected.

Referring still to FIG. 4, at step 330, a determination is made as to whether the document 110 may work in a client-server operation. That is, components providing contextually sensitive functionality to the application 110, or updates or changes to those components, may be stored at a remote server location separate from the computer 20. If the document is to be enabled to obtain necessary components for operation of the application and document from a remote server location, the method proceeds to step 335, and server code is written to a server location for responding to client-side actions performed by the user at the computer 20. That is, application programming interfaces for corresponding between the computer 20 and a remote server 49 are written for obtaining server-based data and application components necessary for providing the contextually sensitive functionality of the present invention. If it is desired that the application point to a remote server for data and application components, a solution location identifier, such as a solution URL, is added to point the application to a location on the remote server to obtain the necessary data and application components.

At step 340, a manifest of all of the programming components described above is created for identifying the list of components, dlls, schema files, and XML files that will be used to provide various solutions and functionality to the document 110. A pointer is added to the document 110 for pointing the document to the manifest of components for obtaining functionality provided by individual and various components. For a detailed description of the manifest, see U.S. Patent Application entitled "Mechanism for Downloading Software Components From A Remote Source For Use By A Local Software Application," Ser. No. 10/164,260, filed Jun. 5, 2002, which is incorporated herein by this reference as if fully set out herein. At step 350, all files, code, and changes to the document 110 are saved, and the document creation method ends at step 390. Accordingly, the document 110 is now in a condition to be opened and utilized by a user.

Figure 5:
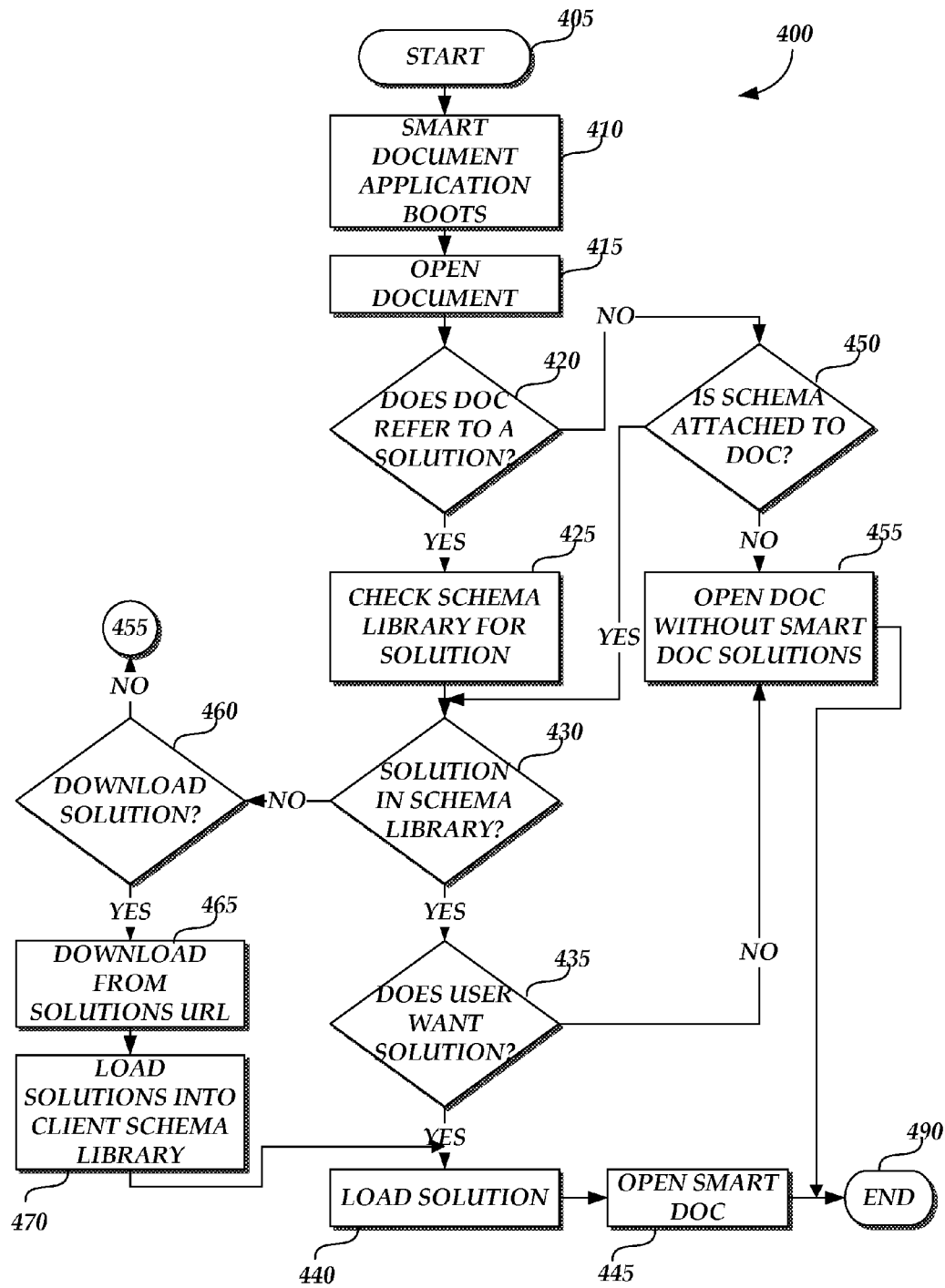
FIG. 5 is a flow chart illustrating a method for opening a document created in accordance with an embodiment of the present invention.

FIG. 5 refers to the steps involved in opening and utilizing the document 110. For purposes of example only, the employee performance review document 110 is described with reference to the steps involved in opening a "smart" document created and implemented in accordance with an embodiment of the present invention. The method 400 begins at start step 405, and proceeds to step 410 where the application 100 is booted by the user. As is understood by those skilled in the art, the application 100 may be booted by selecting the application or by selecting a document 110 created with the application 100.

At step 415, the user selects the document 110 for opening in a manner consistent with the application 100. At step 420, a determination is made as to whether the document 110 refers to a solution. That is, at step 420, a determination is made as to whether the document 110 is annotated with pointers to a solution or to multiple solutions for providing contextually sensitive tools and help information to the document, as described above. As a part of the check to determine whether the document 110 points to a solution or to multiple solutions, a determination is also made as to whether a schema has been attached to the document as described above. If the document does refer to a solution, for example a solution for providing the user with assistance in preparation of the user's employee review document 110, the method proceeds to step 425 and the application 100 calls the schema library 105 to determine whether the solution referred to by the document 110 is stored in the schema library 105. At the schema library, the determination includes a determination as to what components in the schema library are necessary; that is, what components are associated with the solution I.D. For example, the document 110 may have a schema attached to define the rules governing the XML structure of the document 110, but that was created without reference to a particular solution.

At step 430, a determination is made as to whether the solution is stored in the schema library. As should be understood, multiple solutions may be attached to the document 110. For example, a first solution might include helpful information and actions to provide contextually sensitive information regarding completion of the document 110 by a particular user. A second solution may be attached to the document 110 for providing information to a supervisor of the user so that the contextually sensitive information provided to the supervisor will give the supervisor information as to how to evaluate each section of the employee's review document.

Figure 6:
FIG. 6 illustrates a computer-generated dialog box for offering multiple document solutions to a user.

If multiple solutions are referred to by the document 110, a prompt may be provided to the user, such as the dialog box 500, illustrated in FIG. 6, to notify the user that multiple solutions are available for this document. The user may then select one solution from the list of solutions for providing the desired functionality to the user after the document opens.

At step 435, a determination is made as to whether the user actually wants the solution to be provided to the user after the document 110 is opened. As should be understood, a dialog box similar to the dialog box 500 may be presented to the user to query the user as to whether she desires the help content and tools functionality. The user may have completed the document 110 on numerous occasions and may not now desire additional help functionality or action functionality. If desired, the user may elect to always receive the solution upon opening the document 110. Similarly, the user may elect to have the document 110 via the application 100 check for updates to the solution each time the document 110 is opened.

If the user declines the solution, the method proceeds to step 455, and the document is opened without "smart" document solutions according to the normal procedures required and implemented by the application 100. If the user does desire the functionality of the solution referred to by the document 110, the method proceeds to step 440, and the solution is loaded for use by the application 100 and document 110. As should be understood by those skilled in the art, loading the solution includes calls from the document 110 via the application 100 to all necessary files, dlls, component add-ins, and XML files associated with the solution and stored in the schema library 105.

Upon being called by the document 110, each called file is registered with the application 100 via the computer's operating system, and a path is established between each called file and the application 100 and document 110 for provision of the functionality associated with each file. For example, if a particular dll that is used for drawing the document tools pane 135 must be assigned a registry key for proper communication with the application 100 and document 110, this registration process is performed during the load solution step 440. At step 445, the "smart" document 110 is opened and is displayed on the user's computer screen, as illustrated in FIG. 1.

Referring back to step 420, if the document does not refer to a solution, the method proceeds to step 450, and a determination is made as to whether a schema has been attached to the document. If the document has an attached schema, but no reference to a particular solution, the method proceeds to step 430 and a "check" is made of the schema library as to whether a solution does exist that may be associated with the schema that is attached to the document 110. That is, even where no solution is referred to in the document 110, the schema library may have solutions that have been obtained by the user of the computer 20 subsequent to the creation of the document 110 that may be utilized by the document 110 even though the document 110 was not originally created to refer to the solution.

If a solution does exist in the schema library for the document 110, the method proceeds to step 435, and the steps thereafter, as described above. If a schema is not attached to the document 110, the method proceeds to step 455, and the document is opened without "smart" document solutions.

Figure 7:
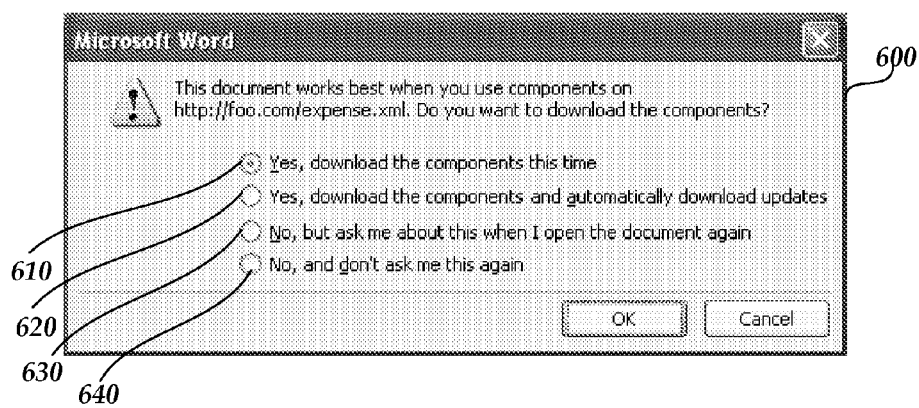
FIG. 7 illustrates a computer-generated dialog box for assisting a user with downloading components to an application created in accordance with the present invention.

Referring back to step 430, if no solution(s) are found in the schema library associated with the solution referred to by the document 110 or associated with the attached schema, the method proceeds to step 460, and a determination is made as to whether the user would like to download a solution. At step 460, the user may be "prompted" by the application 100 and informed that the document 110 will work more efficiently, or will be more useful, if the user downloads certain help and action functionality to the user's document 110. The user may be provided with a "prompt" in the form of a dialog box, such as the dialog box 600 illustrated in FIG. 7. A number of queries may be made to the user to ask the user whether the user would like components comprising the desired solution to be downloaded according to a number of methods. If the user declines to download solution functionality and components, the method proceeds back to step 455, and the document is opened without "smart" document solutions as described above.

If the user desires to download the solution(s) offered to the user, the method proceeds to step 465. At step 465, components necessary for providing the desired solution(s) to the document 110 are downloaded to the user's computer 20 from some remote source, such as a remote web-based server. In order to locate the remote source, the application 100 uses the solution location pointer 118 from the document 110 to locate and obtain the necessary solution components. For a detailed description of a mechanism for downloading data and application components and other software modules from a remote location to the application 110, see U.S. Patent Application entitled "Mechanism for Downloading Software Components From A Remote Source For Use By A Local Software Application," Ser. No. 10/164,260, filed Jun. 5, 2002, which is incorporated herein by this reference as if fully set out herein. At step 470, the downloaded solutions are loaded into the client-side schema library 105, and the solution is loaded as described above so that the document 110 will include the functionality of the solution.

Figure 8:
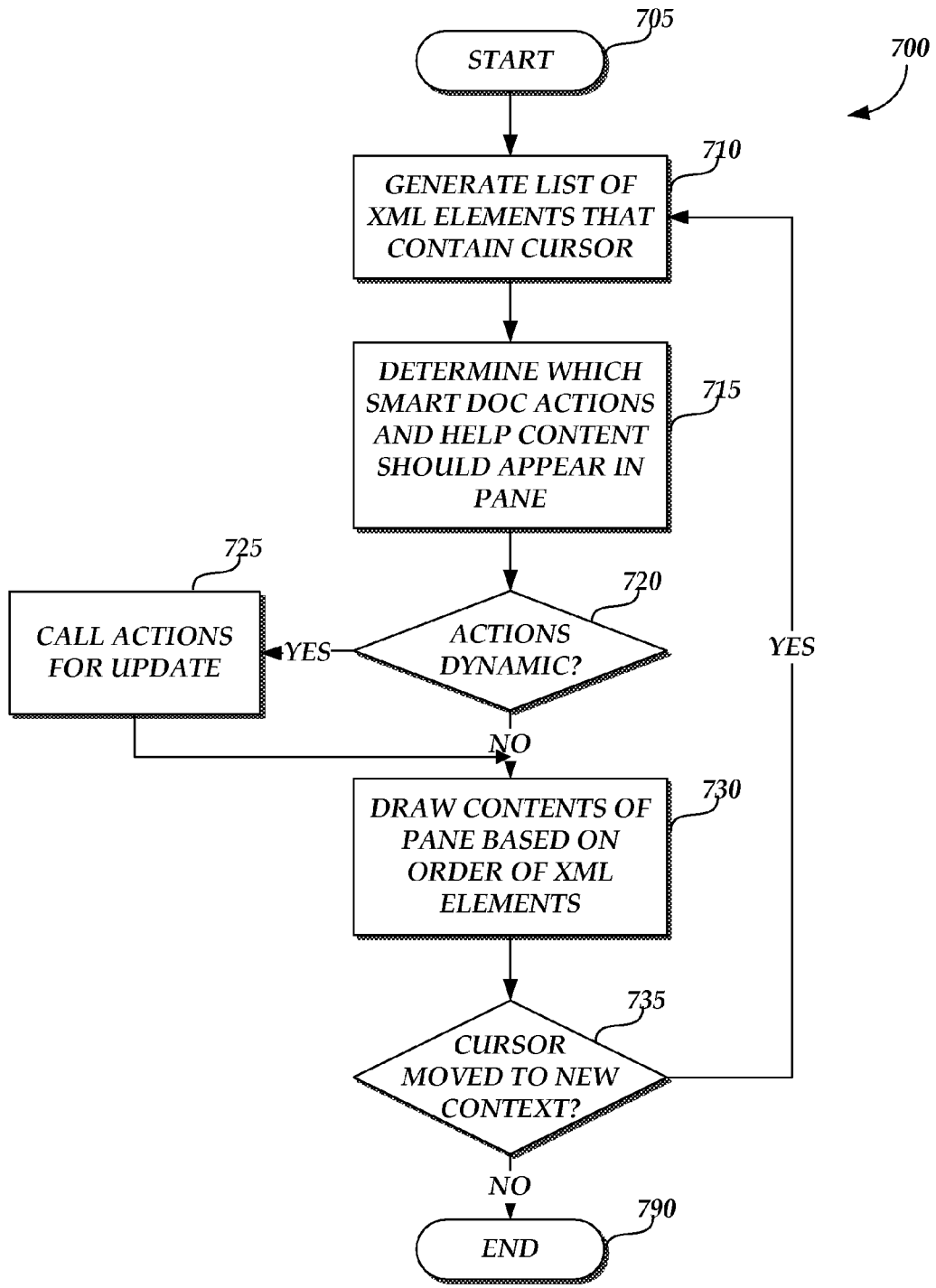
FIG. 8 is a flow chart illustrating a method of determining what content to display in a document tools pane according to an embodiment of the present invention.

FIG. 8 is a flow chart illustrating a method for determining what to display in the document tools pane 135 after a document 110 is opened with a "smart" document solution. For purposes of the description of the steps illustrated with reference to FIG. 8, the document 110 has been opened with a "smart" document solution which has been loaded and is running. By way of example, consider that the user has placed the computer cursor in a particular location with the document 110, such as the "objectives" section 125.

The method 700 begins at start step 705, and proceeds to step 710, where a list of XML elements that surround the cursor is generated. The position of the cursor within the XML hierarchy is located, and the X-path expression to get to the position where the cursor is located is determined. For example, referring to the simplified XML code set forth above, the cursor may be located within the "e-mail" tag and inside the larger XML tree within the "employee review" tag.

At step 715, a determination is made as to which tools and help content should appear in the document tools pane 135. To make this determination, the application 100 enters a look-up table stored on the client computer 20 that contains information about which XML elements have which particular tools, help content, controls, etc., associated with those XML elements. For example, if the cursor is located in the "e-mail name" element within the "personal information" section 120, the application 100 will enter the look-up table to determine which particular tools or help content are associated with the e-mail name element.

Each document action, help item, and control associated with each element is populated with a unique identification (ID) associated with each XML element to which it is applied so that the application 100 may readily locate the actions, help items, or tools associated with the XML element. At step 720, a determination is made as to whether any of the actions, help items, or controls are dynamic. A control may appear differently based on the context or background information for the context. The "objectives" section of the review document 110 may be associated with a "Submit Review" button when the section is completed. On the other hand, if the section is not completed, the "Submit Review" button may not appear in the pane 135 because the document should not be submitted without the completed "objections" section. Accordingly, the "Submit Review" button in this case may be identified as dynamic at step 720, and the method then proceeds to step 725. At step 725, the document 110 via the application 100 calls the component representing the "Submit Review" button and provides that component with the context of the cursor position, for example, whether the "objectives" element has been completed or not.

At step 730, after a determination has been made that the actions, help content, or controls are static or dynamic, the contents of the document tools pane 135 are drawn on the user's computer screen adjacent to the document 110, as illustrated in FIG. 1. At step 735, a determination is made as to whether the cursor is moved to a new context. For example, after the user completes an entry in the "objectives" section 125, the user may move the cursor to the "personal information" section 120 to complete that section. If the cursor does not move, the method proceeds to step 790 and ends. That is, as long as the cursor stays in the current context, no additional changes are made to the content of the document tools pane 135. If the cursor is moved to a new context within the document, the method proceeds back to step 710 where a new list of XML elements containing the cursor is generated, and the method proceeds on as described above to provide new content in the document tools pane 135 associated with the new position and context of the cursor.

Referring back to FIG. 1, the following is a description of the tools and help content drawn in the document tools pane 135. The particular text and controls illustrated in FIG. 1 are by way of example only, and vary with the context of the cursor position as described above. The name 140 is a name for the document XML element associated with the actions and tools shown in the document tools pane 135. The name may refer to the schema that is attached to the document, for example, employee performance review form, or the name 140 may refer to the XML element in which the cursor is currently located. For example, if the cursor is located in the "objectives" section, the name 140 may be re-drawn as "objectives section." The document actions 145 are displayed based on the cursor context and based on whether the actions are static or dynamic. As set forth above, the "Submit Review" action, for example, may be a dynamic action that is not displayed in the document actions pane 135 if all required sections of the document 110 have not been completed. The "Last Years Objectives" help topic 155 is shown in a collapsed display. Selecting the "+" expands the help topic to display additional sub-topics contained therein. The "Objective Writing Tips" help topic is shown in an expanded view, showing the full content 160 available under that help topic. If an XML element within the document 110 has no "smart" document actions or tools associated with it, that XML element is not shown or identified in the document tools pane 135.

Help topics and tools may be nested, meaning that sub-help topics and sub-actions may be included in help topics and document tools. If the cursor is in multiple elements because of nesting, then the number of sections in the document tools pane 135 can be greater than two. In this case, the nested elements are shown in order of nesting where the outermost element is at the top of the document tools pane 135 and innermost element is at the bottom of the document tools pane 135. If the elements, actions, tools, and help content do not fit on one page, a scroll bar may be provided, as illustrated in FIG. 1, that will extend over the entire document tools pane 135. Action and help content are listed in the order in which the dlls, or components that provide them to the document 110 return their names in response to a call from the application 100. According to one embodiment, XML elements that are not associated with actions, controls or help topics are not shown to the user. If desired, however, all XML elements may be shown in the pane 135 to make the user aware of the complete XML structure of the document 110.

Accordingly, after the document 110 is opened, and the "smart" document solution is loaded and implemented as described above, the user of the document 110 may now enter the document and complete the document with the help of the "smart" document functionality provided in the document tools pane 135. As the user moves the computer cursor through various sections of the document that are tagged with XML structure, the user may be provided with helpful information and tools associated with that portion of the document.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

We claim:

1. A method for providing contextually sensitive functionality to a computer-generated document, the method comprising:
    attaching an Extensible Markup Language (XML) schema to the document defining at least one of the following: permissible data content, data type and data structure for the document;
    annotating particular portions of the document with XML elements;
    associating a solution with a portion of the document, wherein the solution comprises at least one of the following: a document control and a document action associated with content of the document;
    assembling a plurality of software components for providing the solution to the document; and
    providing a contextually sensitive user interface upon a user selecting the portion of the document for editing document content within the portion of the document, the contextually sensitive user interface providing at least one of the following: the document control and the document action configured to be employed in editing the document content, wherein providing the contextually sensitive user interface comprises providing a contextual sensitive user interface having editable elements, the editable elements enabling a user to edit textual content within the document.

2. The method of claim 1, wherein providing the contextually sensitive user interface comprises:
    providing the contextually sensitive user interface for displaying the solution, and
    displaying the solution in the contextually sensitive user interface.

3. The method of claim 1, wherein assembling the plurality of software components comprises retrieving a software component from a remote location in a distributed computing environment.

4. The method of claim 1, wherein annotating portions of the document with the XML elements comprises annotating the XML elements so as to be with one of a plurality of text strings and a plurality of data elements within the document.

5. A method for providing contextually sensitive functionality to a computer-generated document, the method comprising:
    attaching an Extensible Markup Language (XML) schema to the document defining data structure for the document;
    structuring the document to associate the document with the XML schema;
    associating a solution with the document structure, wherein the solution comprises at least one of the following: a document control and a document action associated with editing document content;
    assembling a plurality of software components for providing the solution to the document;
    receiving a request for the solution; and
    providing the solution in a contextually sensitive user interface for the document, the contextually sensitive user interface providing the solution to assist a user in editing the document content, wherein providing the contextually sensitive user interface comprises providing a contextual sensitive user interface having editable elements, the editable elements enabling a user to edit textual content within the document.

6. The method of claim 5, wherein receiving the request for the solution comprises receiving a selection of a portion of the document.

7. The method of claim 5, wherein assembling the plurality of software components comprises retrieving a software component from a remote location in a distributed computing environment.

8. The method of claim 5, wherein attaching the XML schema to the document comprises attaching the XML schema to the document wherein the XML elements are associated with one of a plurality of text strings and a plurality of data elements within the document.

9. A computer-readable storage device that stores a set of instructions which when executed perform a method for providing contextually sensitive functionality to a computer-generated document, the method executed by the set of instructions comprising:
    attaching an Extensible Markup Language (XML) schema to the document defining permissible data content to be edited within the document;
    structuring the document to associate the document with the XML schema by annotating particular portions of the document with XML elements;
    associating a solution with the document structure, wherein the solution comprises at least one of the following: at least one document control and at least one document action associated with editing the data content of the document within the permissible data content definition;
    assembling a plurality of software components for providing the solution to the document; and
    providing a contextually sensitive user interface upon a user selecting a portion of the document, the contextually sensitive user interface being configured to provide the solution to assist a user in editing the data content of the document with the solution, wherein providing the contextually sensitive user interface comprises providing a contextual sensitive user interface having editable elements, the editable elements enabling a user to edit textual content within the document.

10. The computer-readable storage device of claim 9, further comprising:
    launching the contextually sensitive user interface for displaying each document action obtained for use by the document; and
    displaying each document action in the contextually sensitive user interface.

11. The computer-readable storage device of claim 9, wherein assembling the plurality of software components comprises retrieving a software component from a remote location in a distributed computing environment.

12. The computer-readable storage device of claim 9, wherein attaching the XML schema to the document comprises attaching the XML schema to the document wherein the XML elements are associated with one of a plurality of text strings and a plurality of data elements within the document.

\* \* \* \* \*